United States Patent
Abraham et al.

(10) Patent No.: US 9,167,609 B2
(45) Date of Patent: Oct. 20, 2015

(54) SYSTEMS AND METHODS FOR LOW-OVERHEAD WIRELESS BEACON TIMING

(75) Inventors: Santosh Paul Abraham, San Diego, CA (US); Guido Robert Frederiks, Aptos, CA (US); Simone Merlin, San Diego, CA (US); Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/544,900

(22) Filed: Jul. 9, 2012

(65) Prior Publication Data

US 2013/0177001 A1  Jul. 11, 2013

Related U.S. Application Data

(60) Provisional application No. 61/506,136, filed on Jul. 10, 2011, provisional application No. 61/531,522, filed on Sep. 6, 2011, provisional application No. 61/549,638, filed on Oct. 20, 2011, provisional (Continued)

(51) Int. Cl.
H04W 76/02 (2009.01)
H04W 28/06 (2009.01)
(Continued)

(52) U.S. Cl.
CPC ............ *H04W 76/021* (2013.01); *H04W 28/06* (2013.01); *H04W 48/12* (2013.01); *H04W 88/10* (2013.01)

(58) Field of Classification Search
CPC ..... H04W 84/12; H04W 84/18; H04W 80/04; H04W 8/26; H04W 88/06

USPC .................................................. 370/329, 252
See application file for complete search history.

(56) References Cited

U.S. PATENT DOCUMENTS

| 5,113,392 A * | 5/1992 | Takiyasu et al. ............... 370/473 |
| 7,047,015 B2 | 5/2006 | Hawe |
| 7,333,460 B2 * | 2/2008 | Vaisanen et al. ............... 370/338 |

(Continued)

FOREIGN PATENT DOCUMENTS

| EP | 2166799 A1 | 3/2010 |
| EP | 2262327 A2 | 12/2010 |

(Continued)

OTHER PUBLICATIONS

IEEE P802.15.3/01292r0 Proposed changes to MAC Frame formats.*

(Continued)

*Primary Examiner* — Melvin Marcelo
*Assistant Examiner* — Peter Solinsky
(74) *Attorney, Agent, or Firm* — James O'Hare; Michael R. Harris

(57) ABSTRACT

Systems, methods, and devices for communicating a compressed beacon are described herein. In some aspects, a method of communicating in a wireless network includes transmitting, at an access point, a full beacon at a first multiple of a beacon interval. The method further includes transmitting a compressed beacon at each beacon interval that is not the first multiple of the beacon interval. Another method of communicating in a wireless network includes receiving, at a wireless device, a full beacon at a first multiple of a beacon interval. The method further includes receiving a compressed beacon at a beacon interval that is not the first multiple of the beacon interval.

112 Claims, 12 Drawing Sheets

F=Full beacon
S=Short beacon
(T)=TIM present

Related U.S. Application Data application No. 61/568,075, filed on Dec. 7, 2011, provisional application No. 61/578,027, filed on Dec. 20, 2011, provisional application No. 61/583,890, filed on Jan. 6, 2012, provisional application No. 61/584,174, filed on Jan. 6, 2012, provisional application No. 61/585,044, filed on Jan. 10, 2012, provisional application No. 61/596,106, filed on Feb. 7, 2012, provisional application No. 61/596,775, filed on Feb. 9, 2012, provisional application No. 61/606,175, filed on Mar. 2, 2012, provisional application No. 61/618,966, filed on Apr. 2, 2012, provisional application No. 61/620,869, filed on Apr. 5, 2012.

(51) Int. Cl.
*H04W 48/12* (2009.01)
*H04W 88/10* (2009.01)

(56) References Cited

U.S. PATENT DOCUMENTS

| | | | |
|---|---|---|---|
| 7,352,716 B2 | 4/2008 | Mikami et al. | |
| 7,366,103 B2 * | 4/2008 | Engwer et al. | 370/252 |
| 7,593,417 B2 * | 9/2009 | Wang et al. | 370/428 |
| 7,660,578 B2 | 2/2010 | Viitamaki et al. | |
| 7,747,273 B2 * | 6/2010 | Chou | 455/522 |
| 7,787,401 B2 | 8/2010 | Kinder et al. | |
| 7,881,755 B1 * | 2/2011 | Mishra et al. | 455/574 |
| 7,970,013 B2 | 6/2011 | Sinha et al. | |
| 8,023,505 B2 * | 9/2011 | Gerosa et al. | 370/389 |
| 8,155,139 B2 * | 4/2012 | Wentink et al. | 370/445 |
| 2003/0186724 A1 | 10/2003 | Tsutsumi et al. | |
| 2003/0193895 A1 * | 10/2003 | Engwer et al. | 370/241 |
| 2005/0122944 A1 * | 6/2005 | Kwon et al. | 370/338 |
| 2005/0152324 A1 | 7/2005 | Benveniste | |
| 2005/0259754 A1 | 11/2005 | Ho et al. | |
| 2007/0002811 A1 * | 1/2007 | Faccin et al. | 370/338 |
| 2008/0049703 A1 * | 2/2008 | Kneckt et al. | 370/342 |
| 2008/0080559 A1 * | 4/2008 | Singh | 370/477 |
| 2008/0225768 A1 | 9/2008 | Wentink | |
| 2009/0109952 A1 | 4/2009 | Lakkis | |
| 2009/0274094 A1 | 11/2009 | Engwer | |
| 2010/0091749 A1 * | 4/2010 | Kish et al. | 370/338 |
| 2010/0107042 A1 * | 4/2010 | Sawai et al. | 714/799 |
| 2010/0157955 A1 * | 6/2010 | Liu et al. | 370/336 |
| 2010/0169410 A1 * | 7/2010 | Lund et al. | 709/203 |
| 2011/0141966 A1 * | 6/2011 | Kasslin et al. | 370/328 |
| 2011/0216660 A1 | 9/2011 | Lee et al. | |
| 2012/0026941 A1 * | 2/2012 | Ahmad et al. | 370/328 |
| 2012/0195244 A1 * | 8/2012 | Wentink et al. | 370/311 |
| 2012/0215939 A1 | 8/2012 | Lu | |
| 2012/0218979 A1 * | 8/2012 | Yeh et al. | 370/338 |
| 2012/0263160 A1 * | 10/2012 | Choi et al. | 370/338 |
| 2012/0307663 A1 * | 12/2012 | Kwak | 370/252 |
| 2012/0314636 A1 * | 12/2012 | Liu | 370/311 |
| 2012/0314696 A1 * | 12/2012 | Liu | 370/338 |
| 2013/0142124 A1 | 6/2013 | Abraham et al. | |
| 2013/0176922 A1 | 7/2013 | Abraham et al. | |
| 2013/0177000 A1 | 7/2013 | Abraham et al. | |
| 2013/0315121 A1 * | 11/2013 | Sampathkumar | 370/311 |

FOREIGN PATENT DOCUMENTS

| | | | | |
|---|---|---|---|---|
| JP | 2003502947 A | 1/2003 | | |
| JP | 2009005118 A | 1/2009 | | |
| JP | 2010081603 A | 4/2010 | | |
| KR | 20110014619 A | 2/2011 | | |
| RU | 2395913 C2 | 7/2010 | | |
| WO | WO-0079762 A1 | 12/2000 | | |
| WO | 2006120555 A2 | 11/2006 | | |
| WO | WO 2006120555 A2 * | 11/2006 | | H04L 12/28 |
| WO | 2007086705 A1 | 8/2007 | | |
| WO | 2009065144 A1 | 5/2009 | | |
| WO | WO-2009058906 A2 | 5/2009 | | |
| WO | WO-2009059229 | 5/2009 | | |
| WO | 2009134288 A1 | 11/2009 | | |
| WO | WO 2009134288 A1 * | 11/2009 | | G06Q 30/00 |
| WO | WO-2010100322 A1 | 9/2010 | | |

OTHER PUBLICATIONS

IEEE Std 802.11-2007.*
IEEE Std 801.16.2-2004.*
IEEE Std 802.16.2-2004.*
IEEE 802.11-2007.*
IEEE Std 802.11-1997 "Information Technology—Telecommunications and Information exchange between systems—Local and metropolitan area networks—Specific Requirements—Part 11: Wireless Lan Medium Access Control (MAC) and Physical Layer (PHY) specifications", Jun. 26, 1997, pp. 1-156, XP002302241.
International Search Report and Written Opinion—PCT/US2012/046111—ISA/EPO—Feb. 4, 2013.
Simone Merlin (Qualcomm Inc): "Short Beacon ; 11-12-0129-02-00ah-short-beacon", IEEE Draft; 11-12-0129-02-00AH-Short-Beacon, IEEE-SA Mentor, Piscataway, NJ USA, vol. 802.11ah, No. 2, Jan. 19, 2012, pp. 1-14, XP017672788, [retrieved on Jan. 19, 2012] Slide 3, lines 10-11 Slide 4, lines 2-4 Slide 6 Slide 9, lines 6-13.

* cited by examiner

F=Full beacon
S=Short beacon
(T)=TIM present

SYSTEMS AND METHODS FOR LOW-OVERHEAD WIRELESS BEACON TIMING

CROSS-REFERENCE TO RELATED APPLICATIONS

This application claims the benefit of U.S. Provisional Application No. 61/506,136, filed Jul. 10, 2011; U.S. Provisional Application No. 61/531,522, filed Sep. 6, 2011; U.S. Provisional Application No. 61/549,638, filed Oct. 20, 2011; U.S. Provisional Application No. 61/568,075, filed Dec. 7, 2011; U.S. Provisional Application No. 61/578,027, filed Dec. 20, 2011; U.S. Provisional Application No. 61/583,890, filed Jan. 6, 2012; U.S. Provisional Application No. 61/584,174, filed Jan. 6, 2012; U.S. Provisional Application No. 61/585,044, filed Jan. 10, 2012; U.S. Provisional Application No. 61/596,106, filed Feb. 7, 2012; U.S. Provisional Application No. 61/596,775, filed Feb. 9, 2012; U.S. Provisional Application No. 61/606,175, filed Mar. 2, 2012; U.S. Provisional Application No. 61/618,966, filed Apr. 2, 2012; and U.S. Provisional Application No. 51/620,869 61/620,869, filed Apr. 5, 2012, all of which are hereby incorporated herein by reference, in their entirety. The present application is related to U.S. application Ser. No. 13/544,897, titled "SYSTEMS AND METHODS FOR LOW-OVERHEAD WIRELESS BEACONS HAVING NEXT FULL BEACON INDICATIONS," filed on even date herewith, and U.S. application Ser. No. 13/544,896, titled "SYSTEMS AND METHODS FOR LOW-OVERHEAD WIRELESS BEACONS HAVING COMPRESSED NETWORK IDENTIFIERS," filed on even date herewith, both of which are hereby incorporated herein by reference, in their entirety.

BACKGROUND

1. Field

The present application relates generally to wireless communications, and more specifically to systems, methods, and devices for compressing wireless beacons.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may include packets, which in some aspects may be referred to as data units or data frames. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

Access points may also broadcast a beacon signal to other nodes to help the nodes synchronize timing or to provide other information or functionality. Beacons may therefore convey a large amount of data, only some of which may be used by a given node. Accordingly, transmission of data in such beacons may be inefficient due to the fact that much of the bandwidth for transmitting beacons may be used to transmit data that will not be used. Thus, improved systems, methods, and devices for communicating packets are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the size of a wireless beacon frame, thereby reducing the overhead in transmitting beacon signals.

One aspect of the disclosure provides a method of communicating in a wireless network. The method includes transmitting, at an access point, a full beacon at a first multiple of a beacon interval. The method further includes transmitting a compressed beacon at each beacon interval that is not the first multiple of the beacon interval.

Another aspect of the invention provides a method of communicating in a wireless network. The method includes receiving, at a wireless device, a full beacon at a first multiple of a beacon interval. The method further includes receiving a compressed beacon at a beacon interval that is not the first multiple of the beacon interval.

Another aspect of the invention provides a wireless device configured to communicate in a wireless network. The wireless device includes a transmitter configured to transmit a full beacon at a first multiple of a beacon interval. The transmitter is further configured to transmit a compressed beacon at each beacon interval that is not the first multiple of the beacon interval.

Another aspect of the invention provides a wireless device configured to communicate in a wireless network. The wireless device includes a receiver configured to receive a full beacon at a first multiple of a beacon interval. The receiver is further configured to receive a compressed beacon at a beacon interval that is not the first multiple of the beacon interval.

Another aspect of the invention provides an apparatus for communicating in a wireless network. The apparatus includes means for transmitting a full beacon at a first multiple of a beacon interval. The apparatus further includes means for transmitting a compressed beacon at each beacon interval that is not the first multiple of the beacon interval.

Another aspect of the invention provides an apparatus for communicating in a wireless network. The apparatus includes means for receiving a full beacon at a first multiple of a beacon interval. The apparatus further includes means for receiving a compressed beacon at a beacon interval that is not the first multiple of the beacon interval.

Another aspect of the invention provides a non-transitory computer-readable medium. The medium includes code that, when executed, causes an apparatus to transmit a full beacon at a first multiple of a beacon interval. The medium further includes code that, when executes, causes the apparatus to transmit a compressed beacon at each beacon interval that is not the first multiple of the beacon interval.

Another aspect of the invention provides a non-transitory computer-readable medium. The medium includes code that, when executed, causes an apparatus to receive a full beacon at a first multiple of a beacon interval. The medium further includes code that, when executed, causes the apparatus to receive a compressed beacon at a beacon interval that is not the first multiple of the beacon interval.

DETAILED DESCRIPTION

Figure 1:
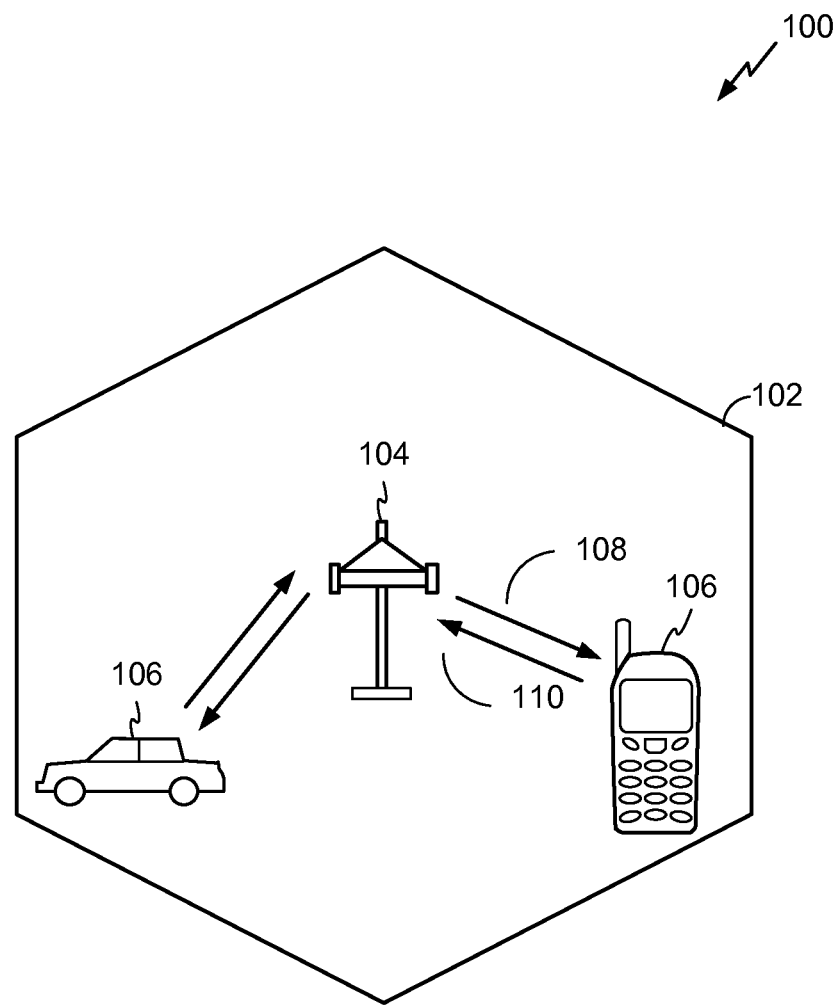
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA may be required to associate with the AP in order to send communications to and/or receive communications from the AP. In one aspect, information for associating is included in a beacon broadcast by the AP. To receive such beacon, the STA may perform a broad coverage search over a coverage region, for example. A search may also be performed by the STA by sweeping a coverage region in a lighthouse fashion, for example. After receiving the information for associating, the STA may transmit a reference signal, such as an association probe or request, to the AP. In some aspects, the AP may use backhaul services, for example, to communicate with a larger network, such as the Internet or a public switched telephone network (PSTN).

Figure 2:
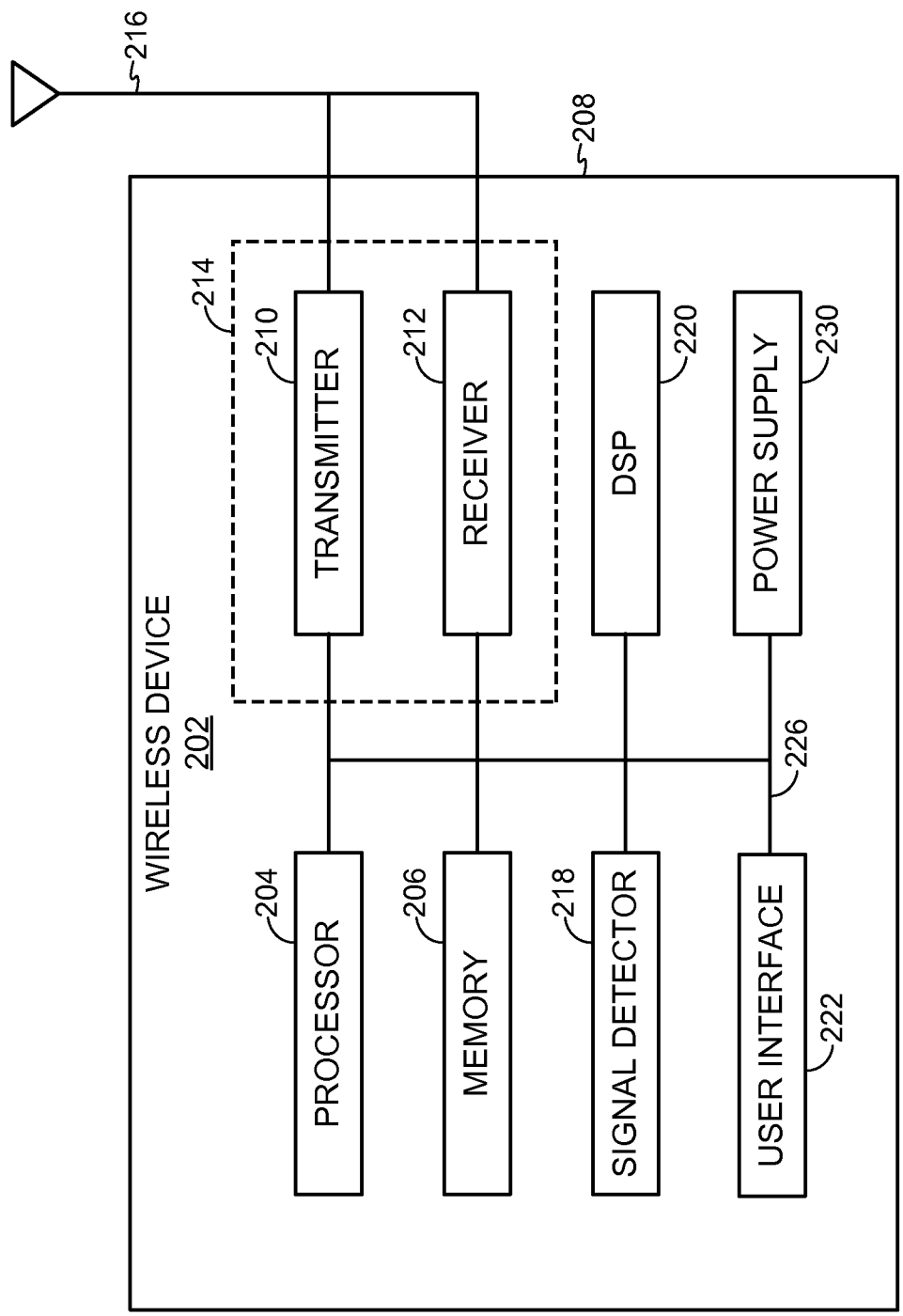
FIG. 2 illustrates various components, including a receiver, that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may include the AP 104 or one of the STAs 106.

The wireless device 202 may include a processor 204 which controls operation of the wireless device 202. The processor 204 may also be referred to as a central processing unit (CPU). The memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as an AP, the processor 204 may be configured to select one of a plurality of beacon types, and to generate a beacon signal having that beacon type. For example, the processor 204 may be configured to generate a beacon signal including beacon information and to determine what type of beacon information to use, as discussed in further detail below.

When the wireless device 202 is implemented or used as a STA, the processor 204 may be configured to process beacon signals of a plurality of different beacon types. For example, the processor 204 may be configured to determine the type of beacon used in a beacon signal and to process the beacon and/or fields of the beacon signal accordingly as further discussed below.

The processor 204 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit beacon signals having different beacon types. For example, the transmitter 210 may be configured to transmit beacon signals with different types of beacons generated by the processor 204, discussed above.

The receiver 212 may be configured to wirelessly receive beacon signals having different beacon types. In some aspects, the receiver 212 is configured to detect a type of a beacon used and to process the beacon signal accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may include a physical layer data unit (PPDU).

The wireless device 202 may further include a user interface 222 in some aspects. The user interface 222 may include a keypad, a microphone, a speaker, and/or a display. The user interface 222 may include any element or component that conveys information to a user of the wireless device 202 and/or receives input from the user.

The wireless device 202 may further include a power supply 230 in some aspects. The power supply 230 may include a wired power supply, a battery, capacitor, etc. The power supply 230 may be configured to provide various levels of power output. In some embodiments, other components of the wireless device 202 may be configured to enter one or more different power consumption states. For example, the processor 204 may be configured to operate in a high-power or low-power mode. Likewise, the transmitter 219 and receiver 212 may be capable of operating in various power states, which may include a disabled state, a full power state, and one or more states in between. Particularly, the device 202 on a whole may be configured to enter a relatively low power state in between transmissions, and enter a relatively high power state at one or more determined times.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may include an AP 104 or an STA 106, and may be used to transmit and/or receive communications including beacon signals. For ease of reference, when the wireless device 202 is configured as an AP, it is hereinafter referred to as a wireless device 202a. Similarly, when the wireless device 202 is configured as a STA, it is hereinafter referred to as a wireless device 202s.

Figure 3:
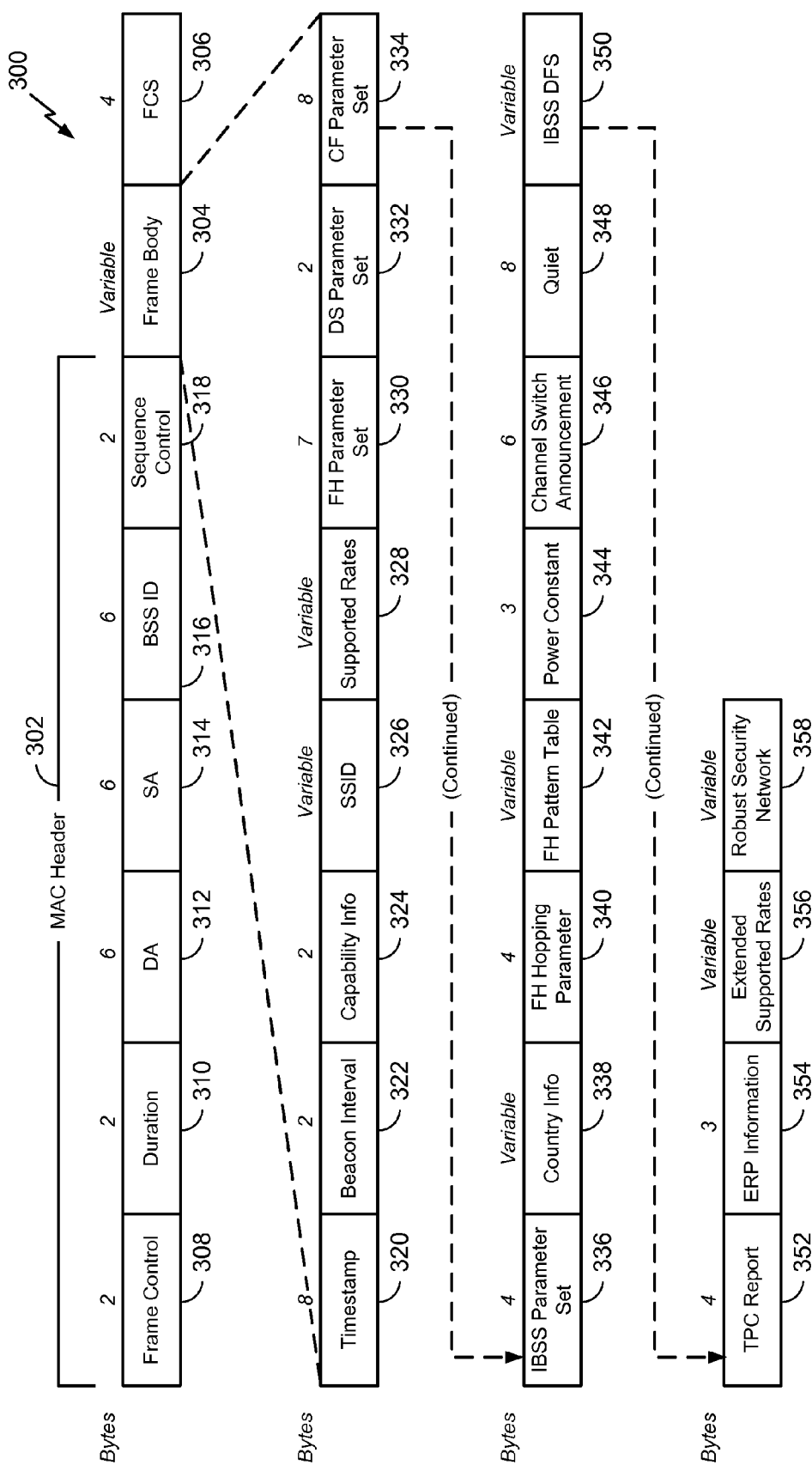
FIG. 3 illustrates an example of a beacon frame used in legacy systems for communication.

FIG. 3 illustrates an example of a beacon frame 300 used in legacy systems for communication. As shown, the beacon 300 includes a median access control (MAC) header 302, a frame body 304, and a frame control sequence (FCS) 306. As shown, the MAC header 302 is 24 bytes long, the frame body 304 is of variable length, and the FCS 306 is four bytes long.

The MAC header 302 serves to provide basic routing information for the beacon frame 300. In the illustrated embodiment, the MAC header 302 includes a frame control (FC) field 308, a duration field 310, a destination address (DA) field 312, a source address (SA) field 314, a basic service set identification (BSSID) field 316, and a sequence control field 318. As shown, the FC field 308 is two bytes long, the duration field 310 is two bytes long, the DA field 312 is six bytes long, the SA field 314 is six bytes long, the BSSID field 316 is six bytes long, and the sequence control field 318 is two bytes long.

The frame body 304 serves to provide detailed information about the transmitting node. In the illustrated embodiment, the frame body 304 includes a timestamp field 320, a beacon interval field 322, a capability information field 324, a service set identifier (SSID) field 326, a supported rates field 328, a frequency-hopping (FH) parameter set 330, a direct-sequence parameter set 332, a contention-free parameter set 334, an independent basic service set (IBSS) parameter set 336, a country information field 338, a FH hopping parameter field 340, a FH pattern table 342, a power constraint field 344, a channel switch announcement field 346, a quiet field 348, a IBSS direct frequency selection (DFS) field 350, a transmit power control (TPC) field 352, an effective radiated power (ERP) information field 354, an extended supported rates field 356, and a robust security network (RSN) field 358.

As shown in FIG. 3, the timestamp field 320 is eight bytes long, the beacon interval field 322 is two bytes long, the capability information field 324 is two bytes long, the service set identifier (SSID) field 326 is a variable length, the supported rates field 328 is a variable length, the frequency-hopping (FH) parameter set 330 is seven bytes long, the direct-sequence parameter set 332 is two bytes long, the contention-free parameter set 334 is eight bytes long, an independent basic service set (IBSS) parameter set 336 is 4 bytes long, the country information field 338 is a variable length, the FH hopping parameter field 340 is four bytes long, the FH pattern table 342 is a variable length, the power constraint field 344 is three bytes long, the channel switch announcement field 346 is six bytes long, the quiet field 348 is eight bytes long, the IBSS direct frequency selection (DFS) field 350 is a variable length, the transmit power control (TPC) field 352 is four bytes long, an effective radiated power (ERP) information field 354 is three bytes long, an extended supported rates field 356 is a variable length, and the robust security network (RSN) field 358 is a variable length.

Referring still to FIG. 3, although the beacon frame 300 is a variable length, it is always at least 89 bytes long. In various radio environments, much of the information contained in the beacon frame 300 may be used infrequently or not at all. Accordingly, in low-power radio environments, it may be desirable to reduce the length of the beacon frame 300 in order to reduce power consumption. Moreover, some radio environments use low data rates. For example an access point implementing an 802.11ah standard may take a relatively long time to transmit the beacon frame 300 due to relatively slow data transmission rates. Accordingly, it may be desirable to reduce the length of the beacon frame 300 in order to shorten the amount of time it takes to transmit the beacon frame 300.

There are a number of approaches by which the beacon frame 300 can be shortened or compressed. In an embodiment, one or more fields of the beacon frame 300 can be omitted. In another embodiment, one or more fields of the beacon frame 300 can be reduced in size, for example by using a different encoding scheme or by accepting lower information content. In one embodiment, the wireless system can allow a STA to query the AP for information omitted from a beacon. For example, the STA can request information omitted from the beacon via a probe request. In an embodiment, a full beacon can be sent periodically or at a dynamically chosen time.

Figure 4:
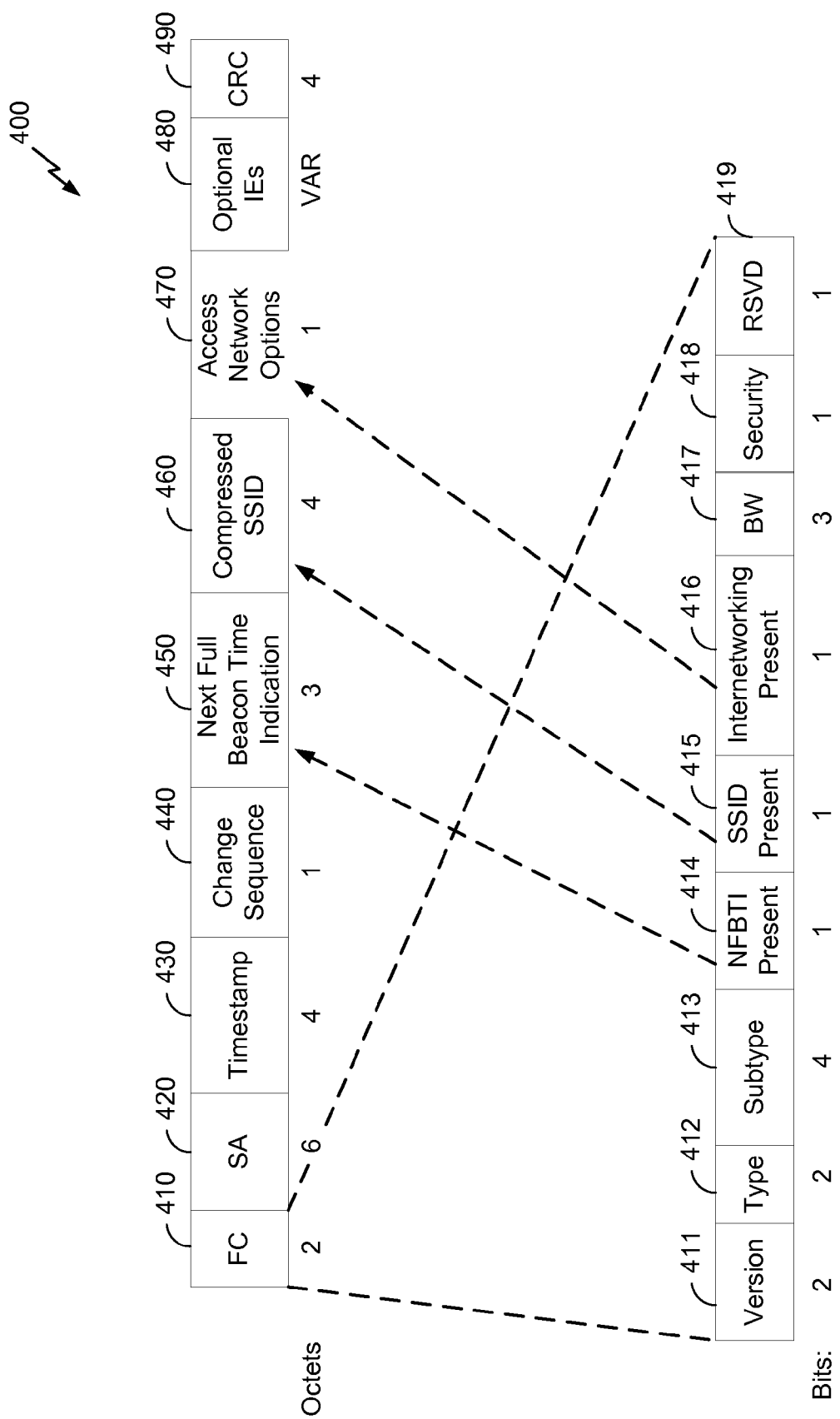
FIG. 4 illustrates an example low-overhead beacon frame.

FIG. 4 illustrates an example low-overhead beacon frame 400. In the illustrated embodiment, the low-overhead beacon frame 400 includes a frame control (FC) field 410, a source address (SA) field 420, a timestamp 430, a change sequence field 440, a next full beacon time indication (NFBTI) 450, a compressed SSID field 460, an access network options field 470, an optional IE field 480, and a cyclic redundancy check (CRC) field 490. As shown, the frame control (FC) field 410 is two bytes long, the source address (SA) field 420 is six bytes long, the timestamp 430 is four bytes long, the change sequence field 440 is one byte long, the duration to next full beacon field 450 is three bytes long, the compressed SSID field 460 is four bytes long, the access network options field 470 is one byte long, and the cyclic redundancy check (CRC) field 490 is four bytes long.

In various embodiments, the low-overhead beacon frame 400 can omit one or more fields shown in FIG. 4 and/or include one or more fields not shown in FIG. 4, including any of the fields discussed herein. Particularly, in various embodiments, one or more of the next full beacon time indication 450, the compressed SSID field 460, and the access network options field 470 can be omitted in accordance one or more flags in the frame control field 410. A person having ordinary skill in the art will appreciate that the fields in the low-overhead beacon frame 400 can be of different suitable lengths, and can be in a different order.

The destination address (DA) field 312, described above with respect to FIG. 3, can be omitted from the low-overhead beacon frame 400 because the beacon frame 400 can be broadcast. Accordingly, there may be no need to identify a specific destination address. Similarly, the BSSID field 316 can be omitted. In an embodiment, the SA field 420 can include the BSSID. The duration field 310 can also be omitted. In an embodiment, if a net allocation vector (NAV) is desired after sending the low-overhead beacon frame 400, it can be signaled using the short interframe space (SIFS) after the beacon frame 400 is sent. Furthermore, the sequence control field 318 can be omitted from the low-overhead beacon frame 400 because sequence control may be unnecessary in a beacon.

In the illustrated embodiment, the frame control (FC) field 410 includes a two-bit version field 411, a two-bit type field 412, a four-bit subtype field 413, a one-bit next fill beacon time indication present flag 414, a one-bit SSID present flag 415, a one-bit internetworking present flag 416, a three-bit bandwidth (BW) field 417, a one-bit security flag 418, and one reserved (RSVD) bit 419. In various embodiments, the FC field 410 can omit one or more fields shown in FIG. 4 and/or include one or more fields not shown in FIG. 4, including any of the fields discussed herein. A person having ordinary skill in the art will appreciate that the fields in the beacon FC field 410 can be of different suitable lengths, and can be in a different order.

In an embodiment, the frame control (FC) field 410 contains a flag indicating that the beacon frame 400 is a low-overhead beacon (LOB), also referred to as a "short beacon." In an embodiment, the FC field 410 can indicate that the beacon frame 400 is a short beacon by setting the type field 412 to "11" (which can indicate a beacon frame) and by setting the subtype field 413 to "0001" (which can indicate that the beacon is compressed, low-overhead, and/or "short"). When a STA receives the beacon frame 400, it can decode the FC field 410 containing the flag indicating that the beacon frame 400 is a short beacon. Accordingly, the STA can decode the beacon frame 400 in accordance with the format described herein.

The next full beacon time indication present flag 414 shown in FIG. 4 includes one bit. In some implementations, the next full beacon time indication present flag 414 may include more than one bit. In some implementations, the next full beacon time indication present flag 414 may include a configurable number of bits. For example, the length of the next full beacon time present indication field 414 may be associated with device specific characteristics such as a service set, device type, or a value stored in memory.

The value included in the next full beacon time indication present flag 414 may be used to identify that the next full beacon time indication field 450 is included in the low-overhead beacon frame 400. Accordingly, a transmitting device, such as the AP 104 (FIG. 1), may set a value in the next full beacon time indication present flag 414 when the transmitting device is configured to transmit a next full beacon time indication field 450 and will be including the next full beacon time indication field 450 in a transmitted frame. For example, in the implementation shown in FIG. 4, the next full beacon time indication present flag 414 including one bit may set the value of the next full beacon time indication present flag 414 to "1" to indicate that the low-overhead beacon frame 400 includes a next full beacon time indication field 450. Conversely, the transmitting device may be configured to set the value of the next full beacon time indication present flag 414 to "0" to indicate that the low-overhead beacon frame 400 does not include a next full beacon time indication field 450.

In some implementations, "presence" of the next full beacon time indication field may also include whether the value included in the next full beacon time indication field is an operational value. For example, in some implementations, if the transmitting device is not configured to generate a next full beacon time indication value for each signal, the transmitting device may set the value for the field to an arbitrary value (e.g., random, constant, null). Accordingly, setting the presence value such that an indication of "not present" is provided may, in some implementations, mean the field is included in the frame but the value contained in the field is non-operational (e.g., arbitrary).

A receiving device, such as the STA 106 (FIG. 1), may process the frame control field 410 to determine whether the received frame includes a next full beacon time indication field 450 by identifying the value included in the next full beacon time indication present flag 414. For example, in the implementation shown in FIG. 4, the next full beacon time indication present flag 414 including one bit may set the value of the next full beacon time indication present flag 414 to "1" to indicate that the low-overhead beacon frame 400 includes a next full beacon time indication field 450. Conversely, the value of the next full beacon time indication present flag 414 may be set to "0" to indicate that the low-overhead beacon frame 400 does not include a next full beacon time indication field 450. In some implementations, the receiving device may alter the processing of the low-overhead beacon frame 400 based on whether the low-overhead beacon frame 400 includes a next full beacon time indication field 450. For example, if the receiving device identifies whether the frame includes a next full beacon time indication field 450, via processing of the next full beacon time indication present flag 414 included in the frame control field 410, an appropriate signal processor may be configured to process the frames with or without a next full beacon time indication field 450. This can improve the processing of the frame because the receiving device may identify characteristics of the frame (e.g., presence of the next full beacon time indication) without necessarily processing the entire frame first.

The SSID present flag 415 shown in FIG. 4 includes one bit. In some implementations, the SSID present flag 415 may include more than one bit. In some implementations, the SSID present flag 415 may include a configurable number of bits. For example, the length of the SSID present flag 415 may be associated with device specific characteristics such as a service set, device type, or a value stored in memory.

The value included in the SSID present flag 415 may be used to identify that the compressed SSID field 460 is included in the low-overhead beacon frame 400. For example, in some implementations, the SSID can be hidden or cloaked. Accordingly, a transmitting device, such as the AP 104 (FIG. 1), may set a value in the SSID present flag 415 when the transmitting device is configured to transmit a compressed SSID field 460 and will be including the compressed SSID field 460 in a transmitted frame. For example, in the implementation shown in FIG. 4, the SSID present flag 415 including one bit may set the value of the SSID present flag 415 to "1" to indicate that the low-overhead beacon frame 400 includes a compressed SSID field 460. Conversely, the transmitting device may be configured to set the value of the SSID present flag 415 to "0" to indicate that the low-overhead beacon frame 400 does not include a compressed SSID field 460.

In some implementations, "presence" of the compressed SSID field may also include whether the value included in the compressed SSID field is an operational value. For example, in some implementations, if the transmitting device is not configured to generate a compressed SSID field value for each signal, the transmitting device may set the value for the field to an arbitrary value (e.g., random, constant, null). Accordingly, setting the presence value such that an indication of "not present" is provided may, in some implementations, mean the field is included in the frame but the value contained in the field is non-operational (e.g., arbitrary).

A receiving device, such as the STA 106 (FIG. 1), may process the frame control field 410 to determine whether the received frame includes a compressed SSID field 460 by identifying the value included in the SSID present flag 415. For example, in the implementation shown in FIG. 4, the SSID present flag 415 including one bit may set the value of the SSID present flag 415 to "1" to indicate that the low-overhead beacon frame 400 includes a compressed SSID field 460. Conversely, the value of the SSID present flag 415 may be set to "0" to indicate that the low-overhead beacon frame 400 does not include a compressed SSID field 460. In some implementations, the receiving device may alter the processing of the low-overhead beacon frame 400 based on whether the low-overhead beacon frame 400 includes a compressed SSID field 460. For example, if the receiving device identifies whether the frame includes a compressed SSID field 460, via processing of the SSID present flag 415 included in the frame control field 410, an appropriate signal processor may be configured to process the frames with or without a compressed SSID field 460. This can improve the processing of the frame because the receiving device may identify characteristics of the frame (e.g., presence of the compressed SSID field) without necessarily processing the entire frame first.

In one embodiment, the AP can set the compressed SSID field 460 to a reserved value indicating that the SSID is hidden. For example, when the SSID is hidden, the compressed SSID field 460 can have a value of all zeroes, all ones, etc. If the SSID hashes to the reserved value when computed using the SSID hash function, the hashed SSID can be remapped to another value (e.g., constant value), or remapped to an alternative value using an alternative hashing function. In another embodiment, the FC field 410 can include an indication that the SSID is hidden.

The internetworking present flag 416 shown in FIG. 4 includes one bit. In some implementations, the internetworking present flag 416 may include more than one bit. In some implementations, the internetworking present flag 416 may include a configurable number of bits. For example, the length of the next full beacon time present indication field 414 may be associated with device specific characteristics such as a service set, device type, or a value stored in memory.

The value included in the internetworking present flag 416 may be used to identify that the access network options field 470 is included in the low-overhead beacon frame 400. Accordingly, a transmitting device, such as the AP 104 (FIG. 1), may set a value in the internetworking present flag 416 when the transmitting device is configured to transmit an access network options field 470 and will be including the access network options field 470 in a transmitted frame. For example, in the implementation shown in FIG. 4, the internetworking present flag 416 including one bit may set the value of the internetworking present flag 416 to "1" to indicate that the low-overhead beacon frame 400 includes an access network options field 470. Conversely, the transmitting device may be configured to set the value of the internetworking present flag 416 to "0" to indicate that the low-overhead beacon frame 400 does not include an access network options field 470.

In some implementations, "presence" of the access network options field may also include whether the value included in the access network options field is an operational value. For example, in some implementations, if the transmitting device is not configured to generate an access network options value for each signal, the transmitting device may set the value for the field to an arbitrary value (e.g., random, constant, null). Accordingly, setting the presence value such that an indication of "not present" is provided may, in some implementations, mean the field is included in the frame but the value contained in the field is non-operational (e.g., arbitrary).

A receiving device, such as the STA 106 (FIG. 1), may process the frame control field 410 to determine whether the received frame includes an access network options field 470 by identifying the value included in the internetworking present flag 416. For example, in the implementation shown in FIG. 4, the internetworking present flag 416 including one bit may set the value of the internetworking present flag 416 to "1" to indicate that the low-overhead beacon frame 400 includes an access network options field 470. Conversely, the value of the internetworking present flag 416 may be set to "0" to indicate that the low-overhead beacon frame 400 does not include an access network options field 470. In some implementations, the receiving device may alter the processing of the low-overhead beacon frame 400 based on whether the low-overhead beacon frame 400 includes an access network options field 470. For example, if the receiving device identifies whether the frame includes an access network options field 470, via processing of the internetworking present flag 416 included in the frame control field 410, an appropriate signal processor may be configured to process the frames with or without an access network options field 470. This can improve the processing of the frame because the receiving device may identify characteristics of the frame (e.g., presence of the access network options) without necessarily processing the entire frame first.

In an embodiment, the bandwidth field 417 serves to indicate a bandwidth of the AP 104 (FIG. 1). In an embodiment, the bandwidth field 417 can indicate a bandwidth of 2 MHz times the binary value of the bandwidth field 417. For example, a value of "0001" can indicate a 2 MHz BSS and a value of "0002" can indicate a 4 MHz BSS. In an embodiment, a value of "0000" can indicate 1 MHz BSS. In various embodiments, other multipliers and/or encodings can be used.

The security flag 418 shown in FIG. 4 includes one bit. In some implementations, the security flag 418 may include more than one bit. In some implementations, the security flag 418 may include a configurable number of bits. For example, the length of the security flag 418 may be associated with device specific characteristics such as a service set, device type, or a value stored in memory.

In an embodiment, the value included in the security flag 418 can serve to indicate whether data encryption is used by the AP 104 (FIG. 1). In an embodiment, details of a robust security network (RSN) can be obtained from a probe response. Accordingly, a transmitting device, such as the AP 104 (FIG. 1), may set a value in the security flag 418 when the transmitting device is configured to use data encryption. For example, in the implementation shown in FIG. 4, the security flag 418 including one bit may set the value of the security flag 418 to "1" to indicate that the transmitting device is configured to use data encryption. Conversely, the transmitting device may be configured to set the value of the security flag 418 to "0" to indicate that the transmitting device is not configured to use data encryption.

A receiving device, such as the STA 106 (FIG. 1), may process the frame control field 410 to determine whether the transmitting device is configured to use data encryption by identifying the value included in the security flag 418. For example, in the implementation shown in FIG. 4, the security flag 418 including one bit may set the value of the security flag 418 to "1" to indicate that the transmitting device is configured to use data encryption. Conversely, the value of the security flag 418 may be set to "0" to indicate that the transmitting device is not configured to use data encryption. In some implementations, the receiving device may alter the processing of the low-overhead beacon frame 400 and/or other frames based on whether that the transmitting device is configured to use data encryption. For example, if the receiving device identifies whether the transmitting device is configured to use data encryption, via processing of the security flag 418 included in the frame control field 410, an appropriate signal processor may be configured to process the frames with or without encryption.

In the illustrated embodiment of FIG. 4, the timestamp field 430 is shorter than the timestamp field 320 described above with respect to FIG. 3. Specifically, the timestamp field 430 is only four bytes long, whereas the timestamp field 320 is eight bytes long. The timestamp field 430 can include one or more least-significant-bits of a "full" timestamp, such as the timestamp field 320. For example, the timestamp field 430 can include the four least significant bytes of the timestamp field 320.

In an embodiment, a STA receiving the low-overhead beacon 400 can retrieve a complete eight-byte timestamp from a transmitting AP via a probe request. In one embodiment, the length of the timestamp field 430 can be chosen such that the timestamp field 430 will not overflow more than once every seven minutes. In a conventional system, the timestamp field 320 value is interpreted as a number of nanoseconds. In an embodiment, the timestamp field 430 value can be interpreted as a number of OFDM symbol periods. Accordingly, in embodiments where an OFDM symbol period is longer than a nanosecond, the timestamp field 430 may not overflow as quickly.

In an embodiment, the timestamp field 430 can facilitate a timing synchronization function (TSF) between devices 104 and 106 in the wireless communication system 100. In embodiments where the AP 104 updates the timestamp field 430 at 1 MHz, a four-byte timestamp field 430 will overflow approximately every 72 minutes. In embodiments where device clocks drive at about +/−20 ppm, it would take approximately 1.4 years to drive by 30 min. Accordingly, a device 106 can maintain time synchronization with the AP 104 if it checks the beacon 400 as rarely as once a day.

In the illustrated embodiment of FIG. 4, the change sequence field 440 can serve to provide a sequence number indicative of a change in network information. In the illustrated embodiment, the change sequence field 440 serves keep track of changes to the AP 104. In an embodiment, the AP 104 may increment the change sequence field 440 when one or more parameters of the AP 104 change. For example, the AP may transmit a full beacon when the SSID changes. In one embodiment, the AP 104 may decrement the change sequence field 440, change the change sequence field 440 to a random or pseudorandom number, or otherwise modify the change sequence field 440 when the configuration of the AP 104 changes. In various embodiments, the change sequence field 440 may be referred to as a beacon index or a beacon number.

The STA 106 can be configured to detect a change in the change sequence field 440. When the STA 106 detects the change in the change sequence field 440, the STA 106 may wait for the transmission of a full beacon. The STA 106 may delay transitioning to a sleep or low-power mode while it waits for the AP 104 to transmit a full beacon. In another embodiment, the STA 106 may send a probe request frame to the AP 104 when the STA 106 detects the change in the change sequence field 440. The AP 104 may send updated configuration information to the STA 106 in response to the probe request frame.

Referring still to FIG. 4, the next full beacon time indication 450 can serve to indicate the next time at which the AP 104 will transmit a full beacon, such as the beacon 300. Accordingly, in an embodiment, STAs 106 may avoid probe request transmission, and can sleep while waiting for the full beacon. In various embodiments, the next full beacon time indication 450 can include one or more of: a flag indicating that a full beacon will follow, an absolute time at which the AP 104 will transmit the full beacon, and a duration until the AP 104 will transmit the full beacon.

In the illustrated embodiment, the next full beacon indication 450 can include a next full beacon time indicator. In an embodiment, a STA can use the duration next full beacon time indicator to determine a time to wake up and receive a full beacon, thereby saving power. In the illustrated embodiment, the next full beacon time indicator includes the 3 most significant bytes, of the 4 least significant bytes, of a next target beacon transmit time (TBTT) timestamp. In other words, the next full beacon time indication 450 can include bytes 1 through 4 of the next TBTT timestamp, with byte 0 omitted (in a little endian notation). In an embodiment, the next full beacon time indication 450 can have a resolution in units of 46 µs. In an embodiment, the AP 104 can compute the next TBTT in software, and store the value in the frame. In various embodiments, the next full beacon time indication 450 can be encoded in other manners.

In an embodiment, the next full beacon time indication 450 can include a full beacon follows flag. The full beacon follows flag can include one bit. In some implementations, the full beacon follows flag may include more than one bit. In some implementations, the full beacon follows flag may include a configurable number of bits. For example, the length of the security flag 418 may be associated with device specific characteristics such as a service set, device type, or a value stored in memory. The full beacon follows flag can serve to indicate that the AP 104 will transmit a conventional beacon, such as the beacon frame 300 described above with respect to FIG. 3, after transmitting the low-overhead beacon 400. In an embodiment, the AP 104 transmits a full beacon when the AP's 104 configuration changes. For example, the AP 104 may transmit a full beacon when the SSID changes.

In an embodiment, the next full beacon time indication 450 can include a duration to next full beacon. The duration to next full beacon can serve to indicate the number of time units (TUs) before the next full beacon. In an embodiment, time units can be 1024 µs. In an embodiment, the duration to next full beacon can indicate the number of time units before the next full beacon to within an accuracy of 1 TU. In an embodiment, a STA can use the duration to the next full beacon to determine a time to wake up and receive a full beacon, thereby saving power. In an embodiment, a preset value (such as a null value) in the next full beacon time indication 450 can indicate that the duration to next full beacon feature is not supported, or that the duration is not determined. For example, a value of all zeroes, all ones, and/or any other predetermined value can indicate that the AP does not support providing the duration to the next full beacon, or that the duration is not determined. In various embodiments, the duration to next full beacon can be encoded in other manners.

In the illustrated embodiment of FIG. 4, the compressed SSID field 460 can serve a similar purpose to the SSID field 344, described above with respect to FIG. 3. Specifically, compressed SSID field 460 can identify a wireless network. Whereas the SSID field 344 includes a variable-length alphanumeric string, however, the compressed SSID field 460 can be shorter. For example, the compressed SSID field 460 can include just four bytes. In an embodiment, the compressed SSID field 460 is a hash of the SSID of an access point such as, for example, the SSID hash field 430 described above with respect to FIG. 4. In an embodiment, the compressed SSID field 460 can be a CRC computed on a portion of, or all of, the SSID associated with the AP 104. For example, the compressed SSID field 460 can use the same generator polynomial that is used for calculating the CRC checksum 490.

In an embodiment, a STA can request the full SSID from an AP transmitting the low-overhead beacon frame 400 via a probe request. In another embodiment, a STA searching for a particular SSID can determine whether the AP matches the desired SSID by hashing the desired SSID and comparing the result with the compressed SSID field 460. In an embodiment, the length of the compressed SSID field 460 can be chosen such that the chances of two different network SSIDs hashing to the same value is less than 0.5%.

Referring still to FIG. 4, the access network options field 470 can include access services provided by the AP 104. For example, the access network options field 470 can include a 4-bit access network type field, a one-bit internet flag, a one-bit additional step required for access (ASRA) flag, one-bit emergency services reachable (ESR) flag, and a one-bit unauthenticated emergency service accessible (UESA) flag. The access network options field 470 can help STAs filter out undesired APs in all scanning channels quickly, based on the frequently transmitted compressed beacon 400, without wasting time and/or power to track full beacons 300 or probe responses from the APs.

Referring still to FIG. 4, the optional IE field 480 can include additional information elements, as will be described herein. In one embodiment, the optional IE field 480 includes a full TIM or TIM follows indicator. In another embodiment, the optional IE field 480 includes additional beacon information.

Referring still to FIG. 4, the CRC field 490 can serve a purpose similar to that of the FCS field 306 described above with respect to FIG. 3. Specifically, the CRC field 490 can allow a receiving STA to identify transmission errors in a received beacon. Although the CRC field 490 is shown as four bytes long, the CRC field 490 can be different lengths in various embodiments. In one embodiment, for example, the CRC field 490 is two bytes long. In another embodiment, the CRC field 490 is one byte long. The CRC field 490 can be another type of check code. In an embodiment, the CRC field 490 is a message integrity check (MIC).

In an embodiment, the low-overhead beacon frame 400 can be referred to as an "SSID short beacon." The SSID short beacon 400 can be broadcast (for example, by the AP 104 shown in FIG. 1) to at least one non-associated STA 106. The SSID short beacon 400 can serve to advertise an SSID (or the compressed SSID 430) to non-associated STAs 106, which may be searching for a network. In an embodiment, the AP 104 transmits the SSID short beacon 400 at an SSID short beacon interval. The SSID short beacon interval can be a multiple of the beacon interval field of a full beacon (a "full beacon interval" such as, for example, the beacon interval field 322 discussed above with respect to FIG. 3). For example, the SSID short beacon interval can be 1 times the full beacon interval, 2 times the full beacon interval, 3 times the full beacon interval, etc.

In an embodiment, the frame control (FC) field 410 contains a flag indicating that the beacon frame 400 is a low-overhead beacon (LOB), also referred to as a "short beacon"

and more specifically an "SSID short beacon." In an embodiment, the FC field 410 can indicate that the beacon frame 400 is an SSID short beacon by setting a "type value" (which can be bits B3:B2 of the FC field 410) to "11" (which can indicate a beacon frame) and by setting a "subtype value" (which can be bits B7:B4 of the FC field 410) to "0001" (which can indicate that the beacon is compressed, low-overhead, "short," and/or targeted at unassociated STAs). When a STA receives the beacon frame 400, it can decode the FC field 410 containing the flag indicating that the beacon frame 400 is an SSID short beacon. Accordingly, the STA can decode the beacon frame 400 in accordance with the format described herein. As discussed above, the STA receiving the SSID short beacon may be unassociated with the AP transmitting the SSID short beacon.

In an embodiment, an access point may periodically send a bitmap (i.e., the TIM) within a beacon to identify which stations using power saving mode have data frames waiting for them in the access point's buffer. The TIM identifies a station by an association ID (AID) that the access point assigns during the association process. In various low-traffic and/or low-power network environments, however, it may not be desirable to periodically send the TIM. For example, in electronic price tag applications, an electronic price display may update only once an hour. Therefore, sending a TIM every TIM interval (which is conventionally much shorter than once an hour) may be wasteful. In embodiments where a TIM is not sent every TIM interval, however, the TIM interval is preferentially small so that when an update does occur, it can be communicated swiftly.

Figure 5:
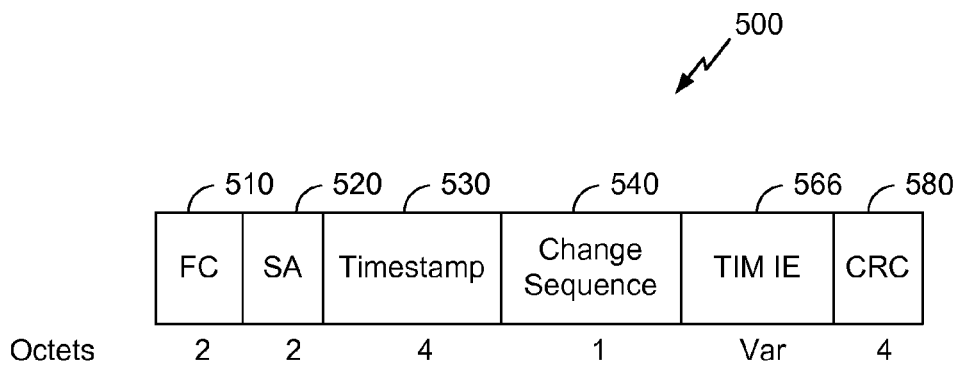
FIG. 5 illustrates another example low-overhead beacon frame.

FIG. 5 illustrates another example low-overhead beacon frame 500. In the illustrated embodiment, the low-overhead beacon frame 500 includes a frame control (FC) field 510, a source address (SA) field 520, a timestamp 540, a change sequence field 550, a traffic indication map (TIM) information element (IE) 566, and a cyclic redundancy check (CRC) field 580. As shown, the frame control (FC) field 510 is two bytes long, the source address (SA) field 520 is six bytes long, the timestamp 540 is four bytes long, the change sequence field 550 is one byte long, the TIM IE field 566 is a variable length, and the cyclic redundancy check (CRC) field 580 is four bytes long. In various embodiments, the low-overhead beacon frame 500 can omit one or more fields shown in FIG. 5 and/or include one or more fields not shown in FIG. 5, including any of the fields discussed herein. A person having ordinary skill in the art will appreciate that the fields in the low-overhead beacon frame 500 can be of different suitable lengths, and can be in a different order.

In an embodiment, the low-overhead beacon frame 500 can be referred to as a "TIM short beacon." The TIM short beacon 500 can be broadcast (for example, by the AP 104 shown in FIG. 1) to at least one associated STA 106. The TIM short beacon 500 can serve to provide a timestamp for STAs to maintain synchronization, and/or a change sequence to indicate when network information has changed. In an embodiment, the AP 104 transmits the TIM short beacon 500 at a TIM short beacon interval. The TIM short beacon interval can be a multiple of the beacon interval field of a full beacon (a "full beacon interval" such as, for example, the beacon interval field 322 discussed above with respect to FIG. 3). For example, the TIM short beacon interval can be 1 times the full beacon interval, 2 times the full beacon interval, 3 times the full beacon interval, etc.

In an embodiment, the TIM short beacon interval can be different from the SSID short beacon interval discussed above with respect to FIG. 4. In an embodiment, the AP 104 may be configured to transmit one or more of the SSID short beacon 400, the TIM short beacon 500, and a full beacon at a target beacon transmit time (TBTT), in accordance with the SSID short beacon interval, the TIM short beacon interval, and the full beacon interval, respectively. In an embodiment, when the AP 104 transmits both the SSID short beacon 400 and the TIM short beacon 500, the AP 104 transmits the TIM short beacon 500 first, followed by the SSID short beacon 400 within the SIFS time.

The destination address (DA) field 312, described above with respect to FIG. 3, can be omitted from the low-overhead beacon frame 500 because the beacon frame 500 can be broadcast. Accordingly, there may be no need to identify a specific destination address. Similarly, the BSSID field 316 can be omitted. The duration field 310 can also be omitted. In an embodiment, if a net allocation vector (NAV) is desired after sending the low-overhead beacon frame 500, it can be signaled using the short interframe space (SIFS) after the beacon frame 500 is sent. Furthermore, the sequence control field 318 can be omitted from the low-overhead beacon frame 500 because sequence control may be unnecessary in a beacon.

In an embodiment, the frame control (FC) field 510 contains a flag indicating that the beacon frame 500 is a low-overhead beacon (LOB), also referred to as a "short beacon," and more specifically a "TIM short beacon." In an embodiment, the FC field 510 can indicate that the beacon frame 500 is a TIM short beacon by setting a "type value" (which can be bits B3:B2 of the FC field 510) to "11" (which can indicate a beacon frame) and by setting a "subtype value" (which can be bits B7:B4 of the FC field 510) to "0010" (which can indicate that the beacon is compressed, low-overhead, "short," and/or targeted at associated STAs). When a STA receives the beacon frame 500, it can decode the FC field 510 containing the flag indicating that the beacon frame 500 is a TIM short beacon. Accordingly, the STA can decode the beacon frame 500 in accordance with the format described herein. As discussed above, the STA receiving the TIM short beacon may be associated with the AP transmitting the TIM short beacon.

In the illustrated embodiment of FIG. 5, the timestamp field 540 is shorter than the timestamp field 320 described above with respect to FIG. 3. Specifically, the timestamp field 540 is only four bytes long, whereas the timestamp field 320 is eight bytes long. In an embodiment, a STA receiving the low-overhead beacon 500 can retrieve a complete eight-byte timestamp from a transmitting AP via a probe request. In one embodiment, the length of the timestamp field 540 can be chosen such that the timestamp field 540 will not overflow more than once every seven minutes. In a conventional system, the timestamp field 320 value is interpreted as a number of nanoseconds. In an embodiment, the timestamp field 540 value can be interpreted as a number of OFDM symbol periods. Accordingly, in embodiments where an OFDM symbol period is longer than a nanosecond, the timestamp field 540 may not overflow as quickly.

In an embodiment, the timestamp field 540 can facilitate a timing synchronization function (TSF) between devices 104 and 106 in the wireless communication system 100. In embodiments where the AP 104 updates the timestamp field 540 at 1 MHz, a four-byte timestamp field 540 will overflow approximately every 72 minutes. In embodiments where device clocks drive at about +/−20 ppm, it would take approximately 1.4 years to drive by 30 min. Accordingly, a device 106 can maintain time synchronization with the AP 104 if it checks the beacon 500 as rarely as once a day.

In the illustrated embodiment of FIG. 5, the change sequence field 550 can serve to provide a sequence number indicative of a change in network information. In the illustrated embodiment, the change sequence field 550 serves keep track of changes to the AP 104. In an embodiment, the AP 104 may increment the change sequence field 550 when one or more parameters of the AP 104 change. For example, the AP may transmit a full beacon when the SSID changes. In one embodiment, the AP 104 may decrement the change sequence field 550, change the change sequence field 550 to a random or pseudorandom number, or otherwise modify the change sequence field 550 when the configuration of the AP 104 changes. In various embodiments, the change sequence field 550 may be referred to as a beacon index or a beacon number.

The STA 106 can be configured to detect a change in the change sequence field 550. When the STA 106 detects the change in the change sequence field 550, the STA 106 may wait for the transmission of a full beacon. The STA 106 may delay transitioning to a sleep or low-power mode while it waits for the AP 104 to transmit a full beacon. In another embodiment, the STA 106 may send a probe request frame to the AP 104 when the STA 106 detects the change in the change sequence field 550. The AP 104 may send updated configuration information to the STA 106 in response to the probe request frame.

Referring still to FIG. 5, the TIM IE field 566 serves to identify which stations using power saving mode have data frames waiting for them in the access point's buffer. In an embodiment, the TIM IE field 566 can be a bitmap. The TIM IE field 566 can identify a station by an association ID (AID) that the access point assigns during the association process.

Referring still to FIG. 5, the CRC field 580 can serve a purpose similar to that of the FCS field 306 described above with respect to FIG. 3. Specifically, the CRC field 580 can allow a receiving STA to identify transmission errors in a received beacon. Although the CRC field 580 is shown as four bytes long, the CRC field 580 can be different lengths in various embodiments. In one embodiment, for example, the CRC field 580 is two bytes long. In another embodiment, the CRC field 580 is one byte long. The CRC field 580 can be another type of check code. In an embodiment, the CRC field 580 is a message integrity check (MIC).

Figure 6:
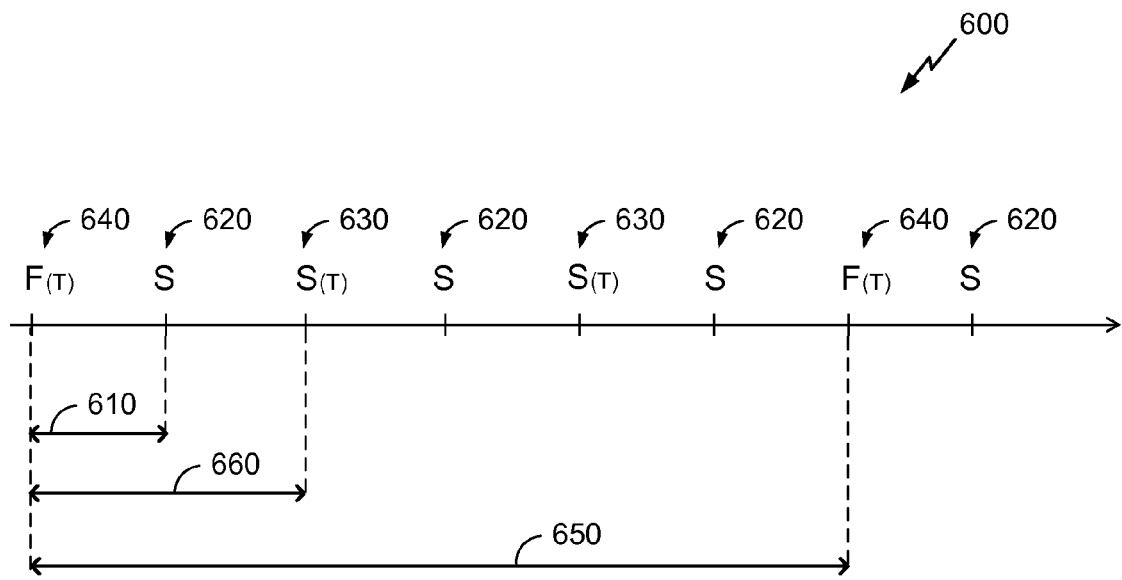
FIG. 6 is a timing diagram illustrating exemplary beacon timing.

FIG. 6 is a timing diagram 600 illustrating exemplary beacon timing. As discussed herein, the AP 104 can be configured to transmit a "full beacon" and/or one or more "short beacons" at various intervals. In an embodiment, the AP 104 can transmit a short beacon 620 and 630 at each beacon interval 610. In various embodiments, the short beacon 620 and 630 can include, for example, one or more of the low-overhead beacon frame 400 (FIG. 4) and the TIM short beacon 500 (FIG. 5). The beacon interval 610 can be communicated, for example, in the beacon interval field 322 (FIG. 3). For example, in an embodiment, the beacon interval 610 can be 100 TUs or 102400 μs.

Referring still to FIG. 6, the illustrated embodiment, the AP 104 transmits the short beacon 620 and 630 only during beacon intervals during which it does not transmit a full beacon 640. The AP 104 can transmit the full beacon 640 at a full beacon interval 650. In an embodiment, the full beacon 640 can include, for example, the full beacon 300 (FIG. 3). The full beacon interval 650 can be a first multiple of the beacon interval 610. For example, in the illustrated embodiment, the full beacon interval 650 is six times the beacon interval 610. In various embodiments, the full beacon interval 650 can be equal to the beacon interval 610, two times the beacon interval 610, three times the beacon interval 610, and so on.

Referring still to FIG. 6, in the illustrated embodiment, the AP 104 can include a traffic indication map (TIM) element in each beacon transmitted at a TIM period 660. The TIM period 660 can be a second multiple of the beacon interval 610. For example, in the illustrated embodiment, the TIM period 660 is twice the beacon interval 610. In various embodiments, the TIM period 660 can be equal to the beacon interval 610, three times the beacon interval 610, four times the beacon interval 610, and so on. As shown, the AP 104 includes the TIM in the full beacons 640 and the short beacons 630, in accordance with a TIM period 660 of two beacon intervals 610. Similarly, in various embodiments, the AP 104 can include a delivery traffic indication map (DTIM) element in each beacon transmitted at a DTIM period (not shown).

In an embodiment, the AP may not transmit the TIM short beacons 630. Instead, all short beacons 620 and 630 may be SSID short beacons 620. For example, the short beacons 620 and 630 can all be the low-overhead beacon 400 (FIG. 4).

Figure 7:
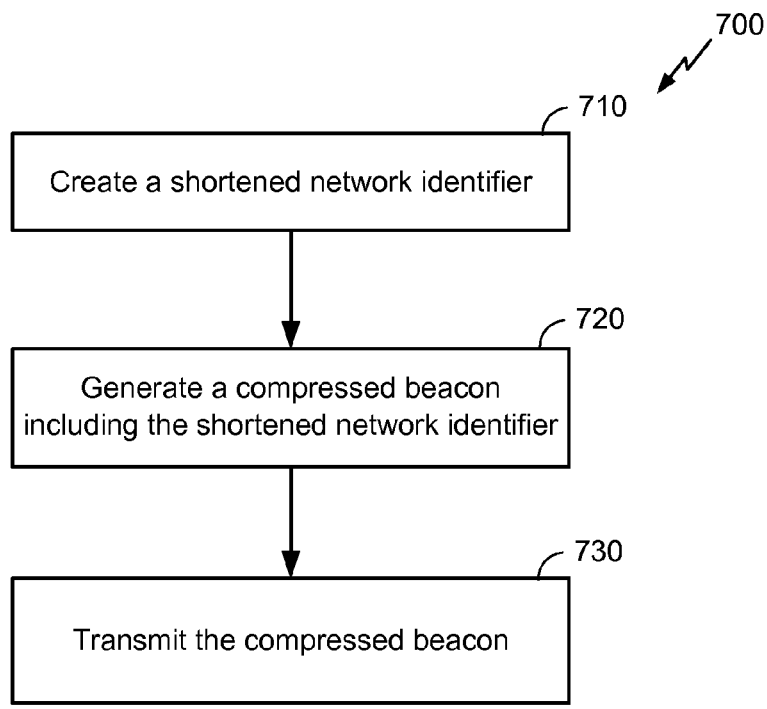
FIG. 7 shows a flowchart of an exemplary method for generating a compressed, or low-overhead, beacon.

FIG. 7 shows a flowchart 700 of an exemplary method for generating a compressed, or low-overhead, beacon. The method of flowchart 700 may be used to create a low-overhead beacon such as, for example, the low-overhead beacon 400 described above with respect to FIG. 4. The compressed beacon may be generated at the AP 104 (FIG. 1) and transmitted to another node in the wireless communication system 100. Although the method is described below with respect to elements of the wireless device 202a (FIG. 2), those having ordinary skill in the art will appreciate that the method of flowchart 700 may be implemented by any other suitable device. In an embodiment, the steps in flowchart 700 may be performed by the processor 204 in conjunction with the transmitter 210 and the memory 206. Although the method of flowchart 700 is described herein with reference to a particular order, in various embodiments, blocks herein may be performed in a different order, or omitted, and additional blocks may be added.

First, at block 710, the wireless device 202a creates a shortened network identifier. The shortened network identifier can be shorter than a full network identifier. For example, the shortened network identifier can be the compressed SSID 460 (FIG. 4), and the full network identifier can be the SSID 326 (FIG. 3). In an embodiment, the processor 204 creates a 1-byte SSID hash from the SSID of the AP 104. In another embodiment, the processor 204 can compute a 4-byte cyclic redundancy check (CRC) on the full network identifier. The processor 204 can use the same generator polynomial used to compute the CRC 490. In various other embodiments, the processor 204 can shorten the SSID in another manner, such as, for example, truncation, cryptographic hashing, etc. In another embodiment, the wireless device 202a can create a shortened identifier from an identifier other than the SSID. In one embodiment, for example, the wireless device 202a can shorten a BSSID. The creation of the SSID hash may be performed by the processor 204 and/or the DSP 220, for example.

Next, at block 720, the wireless device 202a generates the compressed beacon. The compressed beacon can include the SSID hash or another shortened identifier, as discussed above with respect to block 710. In an embodiment, the wireless device 202a can generate the compressed beacon in accordance with the compressed beacon frame 400 discussed above with respect to FIG. 4. The generation may be performed by the processor 204 and/or the DSP 220, for example.

Thereafter, at block 730, the wireless device 202a wirelessly transmits the compressed beacon. The transmission may be performed by the transmitter 210, for example.

Figure 8:
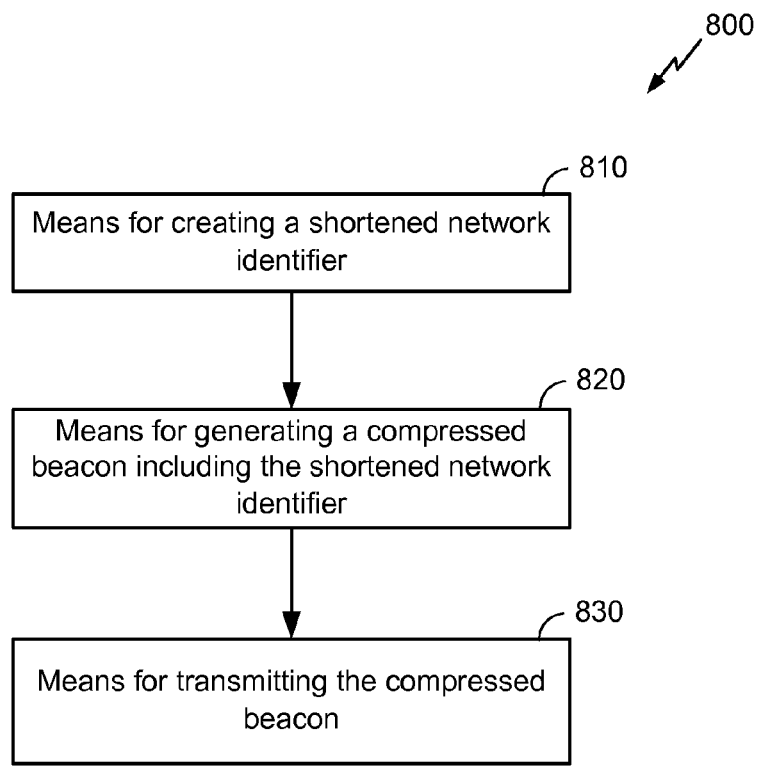
FIG. 8 is a functional block diagram of an exemplary wireless device that may be employed within the wireless communication system of FIG. 1.

FIG. 8 is a functional block diagram of an exemplary wireless device 800 that may be employed within the wireless communication system 100 of FIG. 1. Those skilled in the art will appreciate that a wireless device 800 may have more components than the simplified wireless device 800 illustrated in FIG. 8. The illustrated wireless device 800 includes only those components useful for describing some prominent features of implementations within the scope of the claims. The device 800 includes means 810 for creating a shortened network identifier, means 820 for generating a compressed beacon including the shortened network identifier, and means 830 for transmitting the compressed beacon.

Means 810 for creating a shortened network identifier may be configured to perform one or more of the functions discussed above with respect to the block 710 illustrated in FIG. 7. Means 810 for creating a shortened network identifier may correspond to one or more of the processor 204 and the DSP 220 (FIG. 2). Means 820 for generating a compressed beacon including the shortened network identifier may be configured to perform one or more of the functions discussed above with respect to the block 720 illustrated in FIG. 7. Means 820 for generating a compressed beacon including the shortened network identifier may correspond to one or more of the processor 204 and the DSP 220. Means 830 for transmitting the compressed beacon may be configured to perform one or more of the functions discussed above with respect to the block 730 illustrated in FIG. 7. Means 830 for transmitting the compressed beacon may correspond to the transmitter 210.

Figure 9:
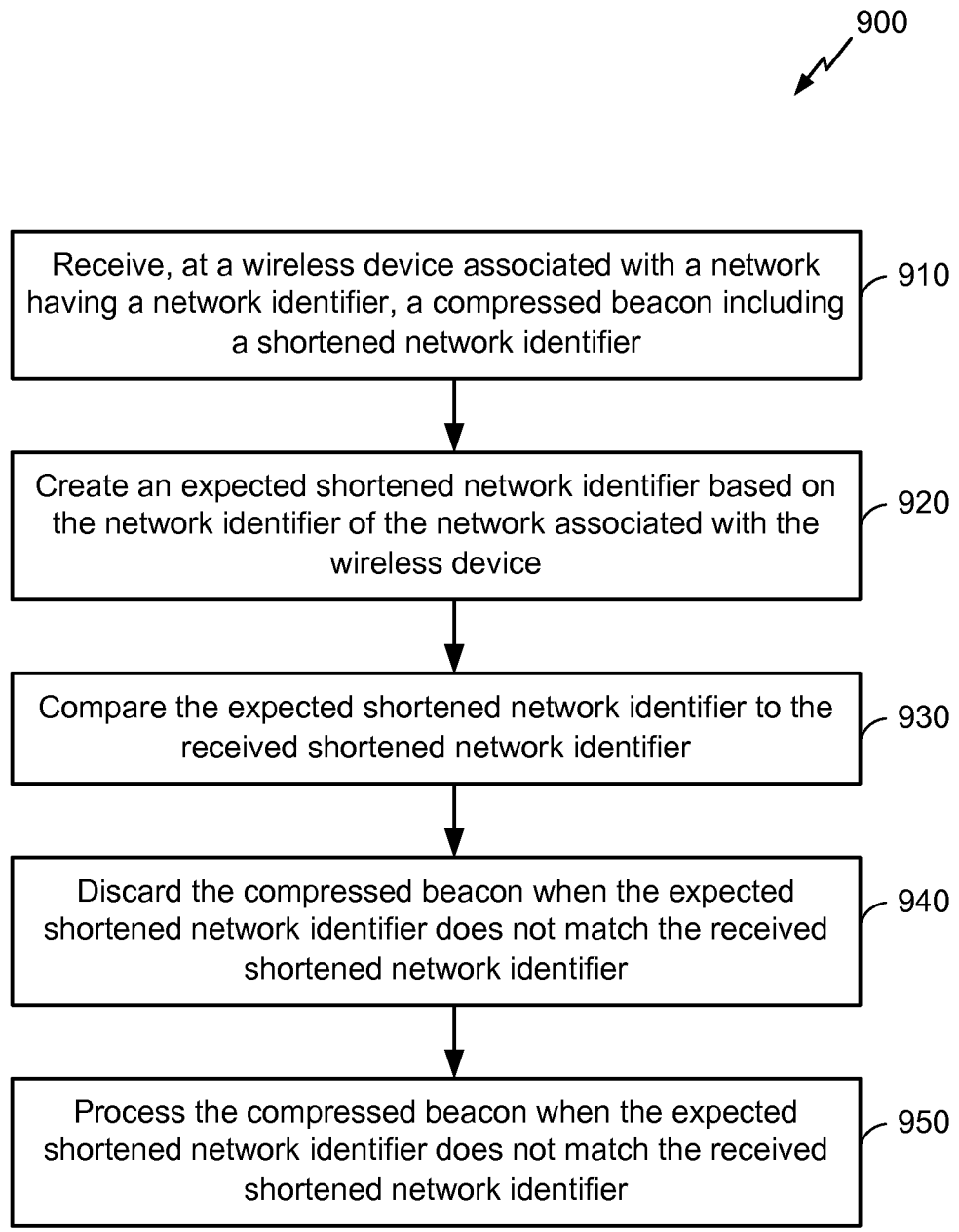
FIG. 9 shows a flowchart of an exemplary method for processing a compressed, or low-overhead, beacon.

FIG. 9 shows a flowchart 900 of an exemplary method for processing a compressed, or low-overhead, beacon. The method of flowchart 900 may be used to process a low-overhead beacon such as, for example, the low-overhead beacon 400 described above with respect to FIG. 4. The compressed beacon may be processed at the STA 106 (FIG. 1) and received from another node in the wireless communication system 100. Although the method is described below with respect to elements of the wireless device 202s (FIG. 2), those having ordinary skill in the art will appreciate that the method of flowchart 900 may be implemented by any other suitable device. In an embodiment, the steps in flowchart 900 may be performed by the processor 204 in conjunction with the receiver 212 and the memory 206. Although the method of flowchart 900 is described herein with reference to a particular order, in various embodiments, blocks herein may be performed in a different order, or omitted, and additional blocks may be added.

First, at block 910, the wireless device 202s receives a compressed beacon including a shortened network identifier. The shortened network identifier can be shorter than a full network identifier. For example, the shortened network identifier can be the compressed SSID 460 (FIG. 4), and the full network identifier can be the SSID 326 (FIG. 3). The device 202s may be associated with a network having a network identifier. For example, the device 202s may be associated with the communication system 100 via the AP 104, which can have an SSID. The compressed beacon can be received via the receiver 212, for example.

Next, at block 920, the wireless device 202s creates an expected shortened network identifier based on the network identifier of the network associated with the device 202s. For example, the processor 204 can compute and create a 1-byte SSID hash from the SSID of the AP 104. In another embodiment, the processor 204 can compute a 4-byte cyclic redundancy check (CRC) on the full network identifier. The processor 204 can use the same generator polynomial used to compute the CRC 490. In various other embodiments, the processor 204 can shorten the SSID in another manner, such as, for example, truncation, cryptographic hashing, etc. In another embodiment, the wireless device 202s can create an expected shortened identifier from an identifier other than the SSID. In one embodiment, for example, the wireless device 202s can shorten a BSSID. The creation of the expected shortened network identifier may be performed by the processor 204 and/or the DSP 220, for example.

Then, at block 930, the wireless device 202s compares the expected shortened network identifier, generated using the SSID of the associated AP 104, to the received shortened network identifier. The comparison may be performed by the processor 204 and/or the DSP 220, for example.

Thereafter, at block 940, the wireless device 202s discards the received compressed beacon when the received shortened network identifier does not match the expected shortened network identifier. The mismatch can indicate that the received compressed beacon is not from an associated AP. The compressed beacon may be discarded by the processor 204 and/or the DSP 220, for example.

Subsequently, at block 950, the wireless device 202s processes the compressed beacon when the received shortened network identifier matches the expected shortened network identifier. The match can indicate that the received compressed beacon is from an associated AP. The compressed beacon may be processed by the processor 204 and/or the DSP 220, for example.

Figure 10:
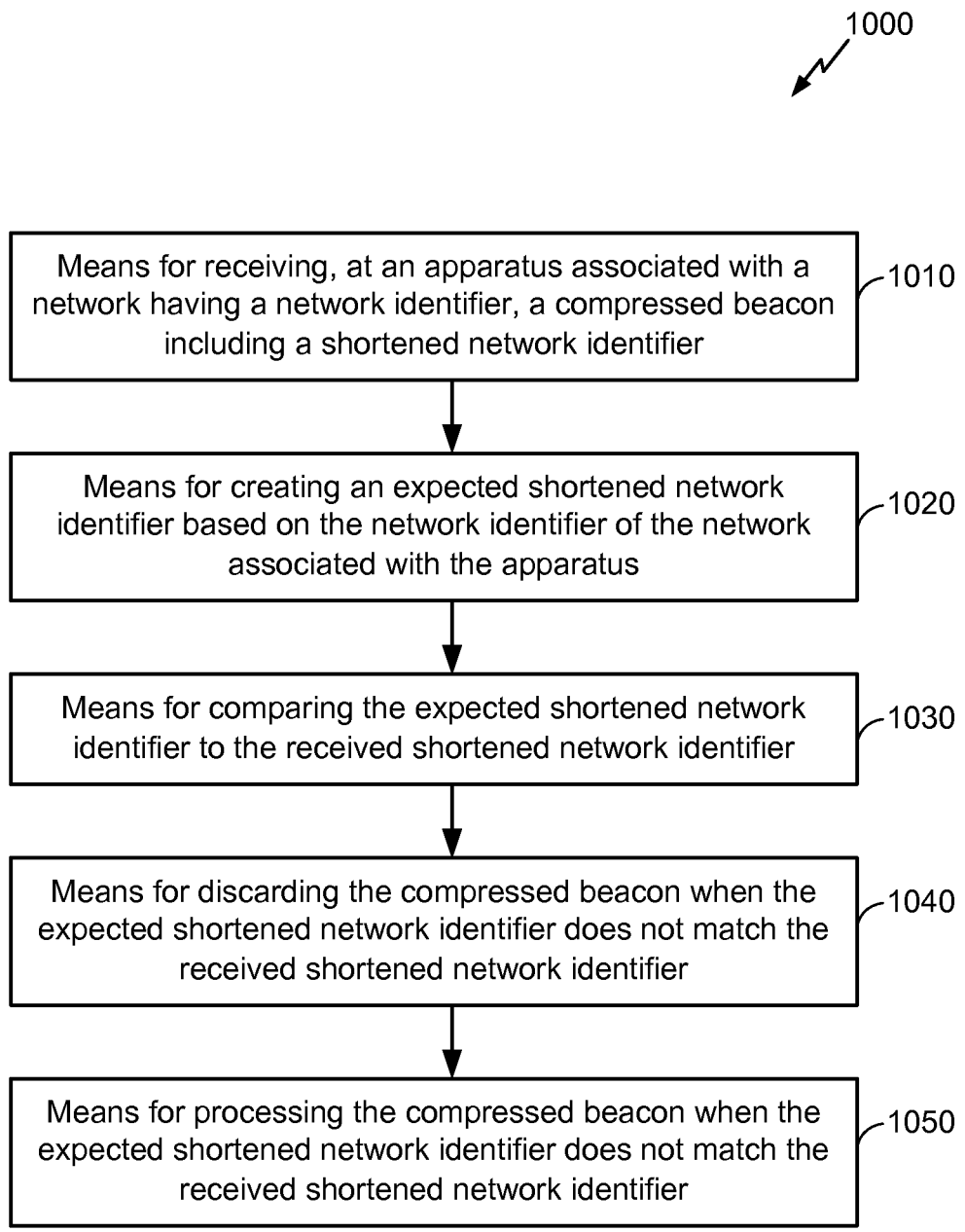
FIG. 10 is a functional block diagram of another exemplary wireless device that may be employed within the wireless communication system of FIG. 1.

FIG. 10 is a functional block diagram of another exemplary wireless device 1000 that may be employed within the wireless communication system 100 of FIG. 1. Those skilled in the art will appreciate that a wireless device 1000 may have more components than the simplified wireless device 1000 illustrated in FIG. 10. The illustrated wireless device 1000 includes only those components useful for describing some prominent features of implementations within the scope of the claims. The device 1000 includes means 1010 for receiving, at an apparatus associated with a network having a network identifier, a compressed beacon including a shortened network identifier, means 1020 for creating an expected shortened network identifier based on the network identifier of the network associated with the apparatus, means 1030 for comparing the expected shortened network identifier to the received shortened network identifier, means 1040 for discarding the compressed beacon when the expected shortened network identifier does not match the received shortened network identifier, and means 1050 for processing the compressed beacon when the expected shortened network identifier does not match the received shortened network identifier.

Means 1010 for receiving, at an apparatus associated with a network having a network identifier, a compressed beacon including a shortened network identifier may be configured to perform one or more of the functions discussed above with respect to the block 910 illustrated in FIG. 9. Means 1010 for receiving, at an apparatus associated with a network having a network identifier, a compressed beacon including a shortened network identifier may correspond to one or more of the receiver 212 and the memory 206 (FIG. 2).

Means 1020 for creating an expected shortened network identifier based on the network identifier of the network associated with the apparatus may be configured to perform one or more of the functions discussed above with respect to the block 920 illustrated in FIG. 9. Means 1020 for creating an expected shortened network identifier based on the network identifier of the network associated with the apparatus may correspond to one or more of the processor 204 and the DSP 220.

Means 1030 for comparing the expected shortened network identifier to the received shortened network identifier may be configured to perform one or more of the functions discussed above with respect to the block 930 illustrated in FIG. 9. Means 1030 for comparing the expected shortened network identifier to the received shortened network identifier may correspond to one or more of the processor 204 and the DSP 220.

Means 1040 for discarding the compressed beacon when the expected shortened network identifier does not match the received shortened network identifier may be configured to perform one or more of the functions discussed above with respect to the block 940 illustrated in FIG. 9. Means 1040 for discarding the compressed beacon when the expected shortened network identifier does not match the received shortened network identifier may correspond to one or more of the processor 204 and the DSP 220.

Means 1050 for processing the compressed beacon when the expected shortened network identifier does not match the received shortened network identifier may be configured to perform one or more of the functions discussed above with respect to the block 950 illustrated in FIG. 9. Means 1050 for processing the compressed beacon when the expected shortened network identifier does not match the received shortened network identifier may correspond to one or more of the processor 204 and the DSP 220.

Figure 11:
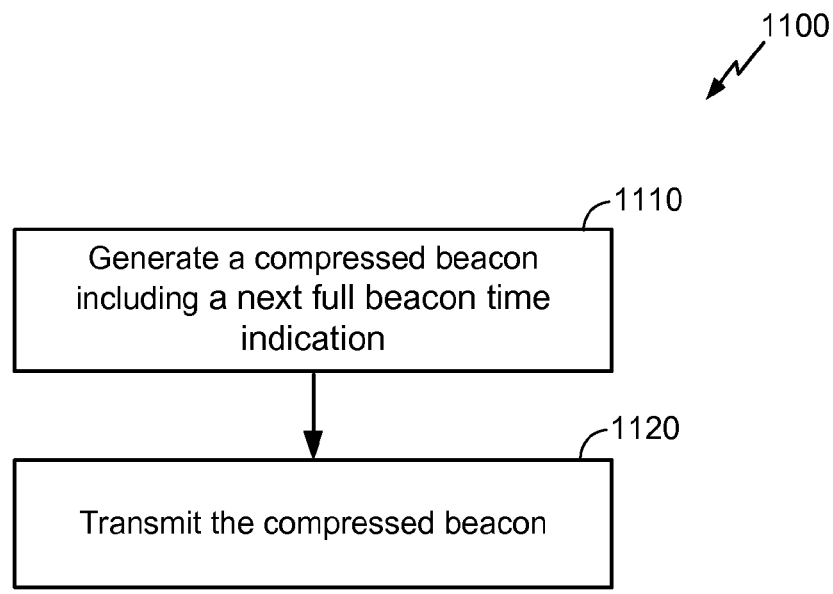
FIG. 11 shows a flowchart of another exemplary method for generating a compressed, or low-overhead, beacon.

FIG. 11 shows a flowchart 1100 of another exemplary method for generating a compressed, or low-overhead, beacon. The method of flowchart 1100 may be used to create a low-overhead beacon such as, for example, the low-overhead beacon 400 described above with respect to FIG. 4. The compressed beacon may be generated at the AP 104 (FIG. 1) and transmitted to another node in the wireless communication system 100. Although the method is described below with respect to elements of the wireless device 202a (FIG. 2), those having ordinary skill in the art will appreciate that the method of flowchart 1100 may be implemented by any other suitable device. In an embodiment, the steps in flowchart 1100 may be performed by the processor 204 in conjunction with the transmitter 210 and the memory 206. Although the method of flowchart 1100 is described herein with reference to a particular order, in various embodiments, blocks herein may be performed in a different order, or omitted, and additional blocks may be added.

First, at block 1110, the wireless device 202a generates a compressed beacon including a next full beacon time indication. In an embodiment, the next full beacon time indication can be the next full beacon time indication field 450, described above with respect to FIG. 4. The wireless device 202a can determine the next time it will transmit a full beacon, such as the beacon 300 (FIG. 3). This time can be referred to as the next target beacon transmit time (TBTT). In an embodiment, the next full beacon time indication can include the time at which the access point will transmit a full beacon. The next full beacon time indication can be the 3 most significant bytes, of the 4 least significant bytes of a next target beacon transmit time (TBTT).

In another embodiment, the next full beacon time indication can include a flag indicating that the wireless device 202a will transmit a full beacon including one or more fields not included in the compressed beacon. The flag may indicate that the next beacon transmitted will be a full beacon. In another embodiment, the next full beacon time indication can include a value indicating a duration until the wireless device 202a transmits the next full beacon. The next full beacon time indication can indicate the number of time units (TUs) until the access point transmits the next full beacon. The compressed beacon and next full beacon time indication can be generated by the processor 204 and/or the DSP 220, for example.

Next, at block 1120, the wireless device 202a wirelessly transmits the compressed beacon. The transmission may be performed by the transmitter 210, for example. Thereafter, at the next TBTT, the wireless device 202a can generate and transmit the full beacon and transmit.

Figure 12:
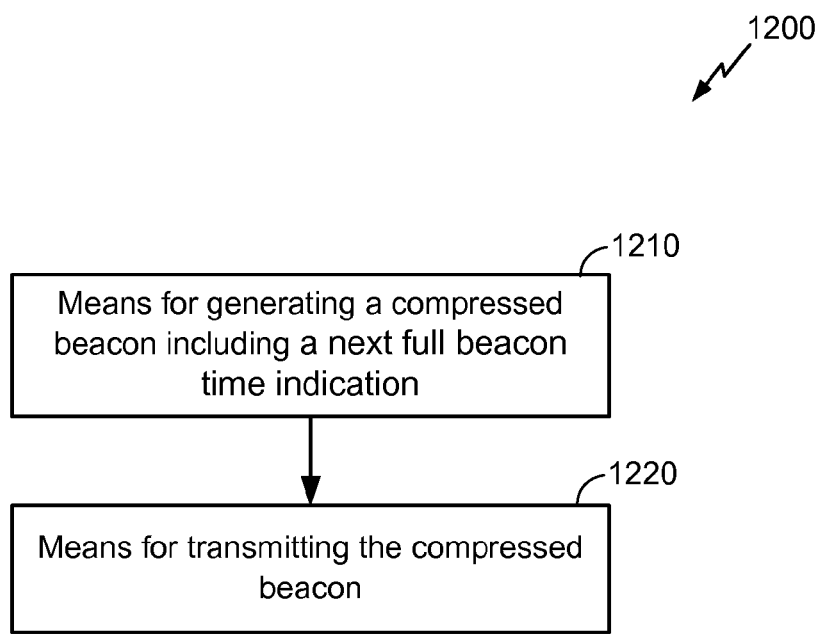
FIG. 12 is a functional block diagram of another exemplary wireless device that may be employed within the wireless communication system of FIG. 1.

FIG. 12 is a functional block diagram of another exemplary wireless device 1200 that may be employed within the wireless communication system 100 of FIG. 1. Those skilled in the art will appreciate that a wireless device 1200 may have more components than the simplified wireless device 1200 illustrated in FIG. 12. The illustrated wireless device 1200 includes only those components useful for describing some prominent features of implementations within the scope of the claims. The device 1200 includes means 1210 for generating a compressed beacon including a next full beacon time indication, and means 1220 for transmitting the compressed beacon.

Means 1210 for generating a compressed beacon including a next full beacon time indication may be configured to perform one or more of the functions discussed above with respect to the block 1110 illustrated in FIG. 11. Means 1210 for generating a compressed beacon including a next full beacon time indication may correspond to one or more of the processor 204 and the DSP 220 (FIG. 2). Means 1220 for transmitting the compressed beacon may be configured to perform one or more of the functions discussed above with respect to the block 1120 illustrated in FIG. 11. Means 1220 for transmitting the compressed beacon may correspond to the transmitter 210.

Figure 13:
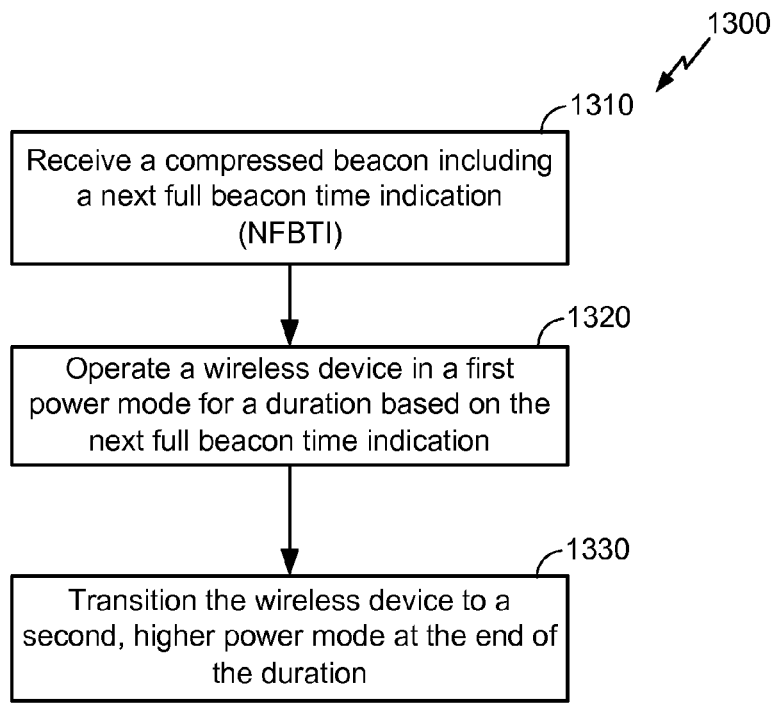
FIG. 13 shows a flowchart of an exemplary method for operating the wireless device of FIG. 2.

FIG. 13 shows a flowchart 1300 of an exemplary method for operating the wireless device 202s of FIG. 2. Although the method is described below with respect to elements of the wireless device 202s (FIG. 2), those having ordinary skill in the art will appreciate that the method of flowchart 1300 may be implemented by any other suitable device. In an embodiment, the steps in flowchart 1300 may be performed by the processor 204 in conjunction with the receiver 212, the power supply 230, and the memory 206. Although the method of flowchart 1300 is described herein with reference to a particular order, in various embodiments, blocks herein may be performed in a different order, or omitted, and additional blocks may be added.

First, at block 1310, the wireless device 202s receives a compressed beacon including a next full beacon time indication (NFBTI). The compressed beacon can be, for example, the low-overhead beacon 400 described above with respect to FIG. 4. The compressed beacon may be generated at the AP 104 (FIG. 1) and transmitted to the STA 106 via the wireless communication system 100. The wireless device 202s can receive the compressed beacon using the receiver 212, for example.

In an embodiment, the next full beacon time indication can be the next full beacon time indication field 450, described above with respect to FIG. 4. As discussed above, the wireless device 202a can determine the next time it will transmit a full beacon, such as the beacon 300 (FIG. 3). This time can be referred to as the next target beacon transmit time (TBTT). In an embodiment, the next full beacon time indication can include the time at which the access point will transmit a full beacon. The next full beacon time indication can be the 3 most significant bytes, of the 4 least significant bytes of a next target beacon transmit time (TBTT).

In another embodiment, the next full beacon time indication can include a flag indicating that the wireless device 202a will transmit a full beacon including one or more fields not included in the compressed beacon. The flag may indicate that the next beacon transmitted will be a full beacon. In another embodiment, the next full beacon time indication can include a value indicating a duration until the wireless device 202a transmits the next full beacon. The next full beacon time indication can indicate the number of time units (TUs) until the access point transmits the next full beacon.

Next, at block 1320, the wireless device 202s operates in a first power mode for a duration based on the next full beacon time indication. For example, the wireless device 202s may enter a low power state until shortly before the next full beacon will be transmitted in order to save power. For example, the wireless device 202s may shut down, or place into a low power mode, one or more components such as the processor 204, the transmitter 210, and/or the receiver 212.

The wireless device 202s may determine the next time that the AP 104 will transmit the full beacon based on the next full beacon time indication received in the compressed beacon. The processor 204 may set a timer to wake up at least a first time before the next full beacon is expected. The wireless device 202s may operate in the first power mode via the power supply 230, in conjunction with other components.

Then, at block 1330, the wireless device 202s transitions to a second, lower power mode at the end of the duration. For example, at the expiration of a timer, the wireless device 204 may wake up from a low power mode and active, or put into a higher-power mode, one or more of the processor 204, the transmitter 210, and the receiver 212. The wireless device 202s may transition into the second power mode via the power supply 230, in conjunction with other components. Subsequently, the wireless device 202s may receive the full beacon from the AP 104.

Figure 14:
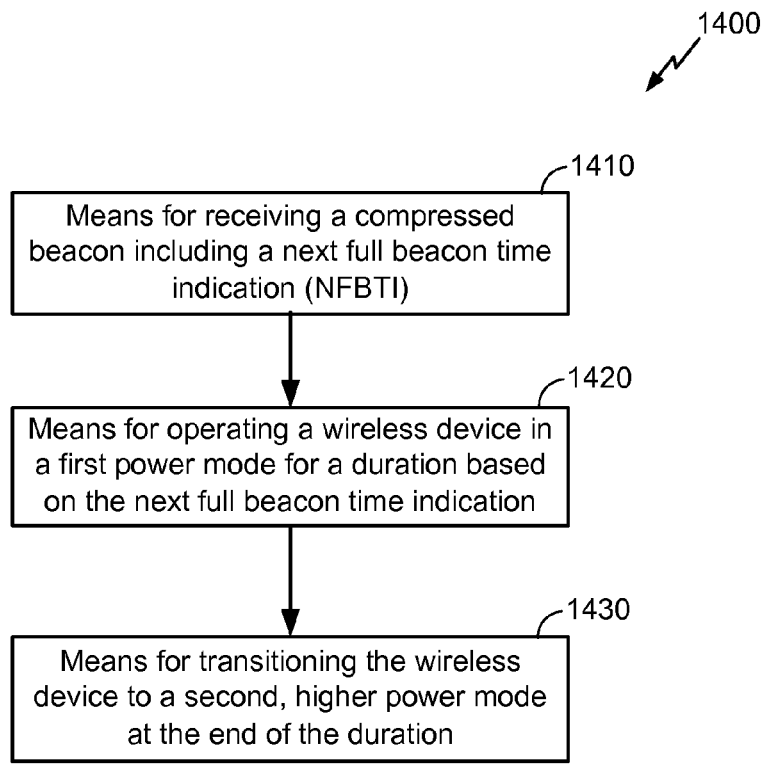
FIG. 14 is a functional block diagram of another exemplary wireless device that may be employed within the wireless communication system of FIG. 1.

FIG. 14 is a functional block diagram of another exemplary wireless device 1400 that may be employed within the wireless communication system 100 of FIG. 1. Those skilled in the art will appreciate that a wireless device 1400 may have more components than the simplified wireless device 1400 illustrated in FIG. 14. The illustrated wireless device 1400 includes only those components useful for describing some prominent features of implementations within the scope of the claims. The device 1400 includes means 1410 for receiving a compressed beacon including a next full beacon time indication (NFBTI), means 1420 for operating a wireless device in a first power mode for a duration based on the next full beacon time indication, and means 1430 transitioning the wireless device to a second, higher power mode at the end of the duration.

Means 1410 for receiving a compressed beacon including a next full beacon time indication may be configured to perform one or more of the functions discussed above with respect to the block 1310 illustrated in FIG. 13. Means 1410 for receiving a compressed beacon including a next full beacon time indication may correspond to one or more of the processor 204 and the receiver 212 (FIG. 2). Means 1420 for operating a wireless device in a first power mode for a duration based on the next full beacon time indication may be configured to perform one or more of the functions discussed above with respect to the block 1320 illustrated in FIG. 13. Means 1420 for operating a wireless device in a first power mode for a duration based on the next full beacon time indication may correspond to one or more of the processor 204 and the power supply 230. Means 1430 transitioning the wireless device to a second, higher power mode at the end of the duration may be configured to perform one or more of the functions discussed above with respect to the block 1330 illustrated in FIG. 13. Means 1430 transitioning the wireless device to a second, higher power mode at the end of the duration may correspond to one or more of the processor 204 and the power supply 230.

Figure 15:
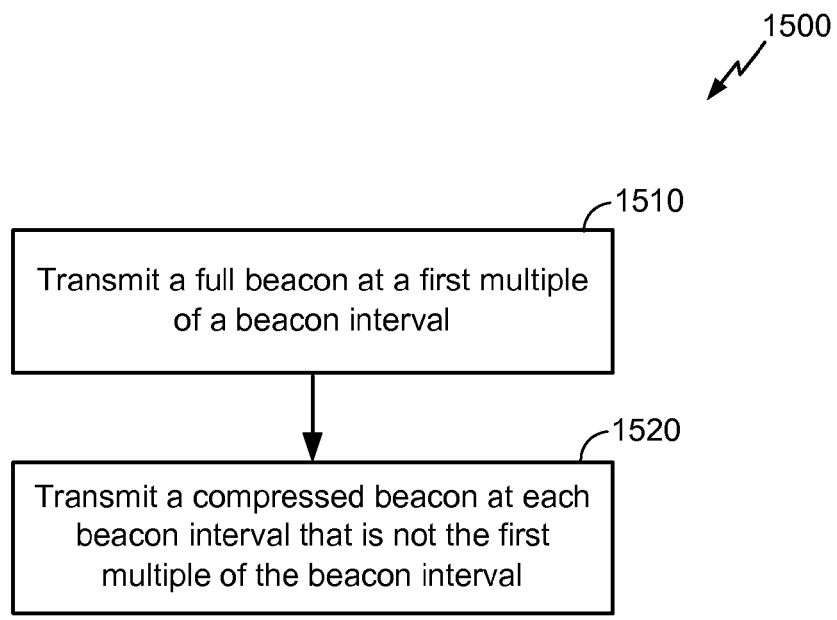
FIG. 15 shows a flowchart of an exemplary method for communicating in the wireless communication system of FIG. 1.

FIG. 15 shows a flowchart 1500 of an exemplary method for communicating in the wireless communication system 100 of FIG. 1. The method of flowchart 1500 may be used to create and transmit a low-overhead beacon such as, for example, the low-overhead beacon 400 described above with respect to FIG. 4. The compressed beacon may be generated at the AP 104 (FIG. 1) and transmitted to another node in the wireless communication system 100. Although the method is described below with respect to elements of the wireless device 202a (FIG. 2), those having ordinary skill in the art will appreciate that the method of flowchart 1500 may be implemented by any other suitable device. In an embodiment, the steps in flowchart 1500 may be performed by the processor 204 in conjunction with the transmitter 210 and the memory 206. Although the method of flowchart 1500 is described herein with reference to a particular order, in various embodiments, blocks herein may be performed in a different order, or omitted, and additional blocks may be added.

First, at block 1510, the wireless device 202a transmits a full beacon at a first multiple of a beacon interval. In an embodiment, the full beacon can be the beacon 300 described above with respect to FIG. 3. In various embodiments, the first multiple can be 2, 3, 4, 5, etc. The wireless device 202a can communicate the beacon interval and/or the first multiple to a STA 106 via a field in the full beacon, in response to a probe request, or it may be preset. The wireless device 202a can generate the full beacon using the processor 204, and can transmit the full beacon via the transmitter 210, for example.

Next, at block 1520, at block 1510, the wireless device 202a transmits a compressed beacon at each beacon interval that is not the first multiple of the beacon interval. The compressed beacon can be, for example, the beacon 400 (FIG. 4). In one embodiment, the wireless device 202a can transmit the compressed beacon at a second multiple of the beacon interval, except where the second multiple coincides with the first multiple. The wireless device 202a can generate the compressed beacon using the processor 204, and can transmit the compressed beacon via the transmitter 210, for example.

Figure 16:
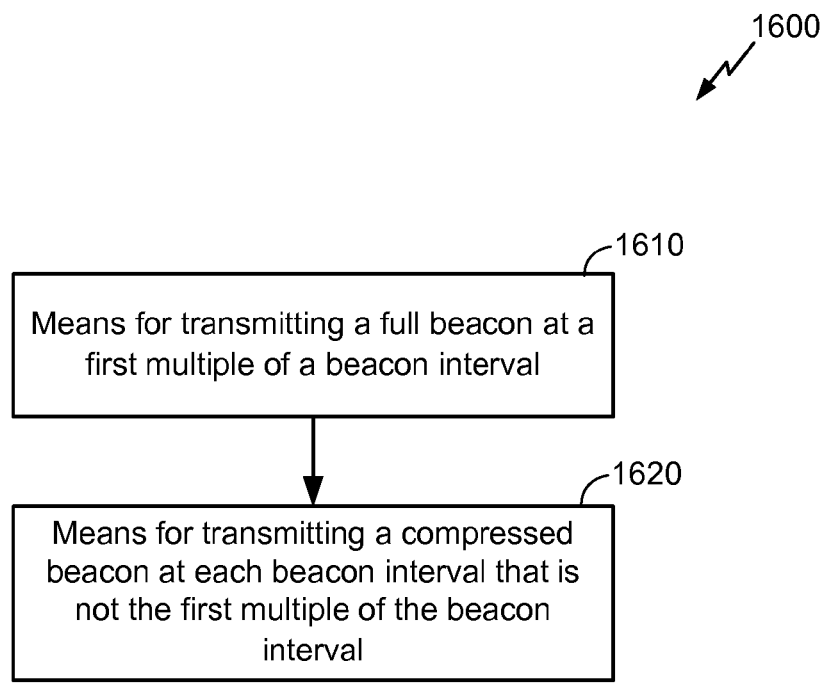
FIG. 16 is a functional block diagram of another exemplary wireless device that may be employed within the wireless communication system of FIG. 1.

FIG. 16 is a functional block diagram of another exemplary wireless device 1600 that may be employed within the wireless communication system 100 of FIG. 1. Those skilled in the art will appreciate that a wireless device 1600 may have more components than the simplified wireless device 1600 illustrated in FIG. 16. The illustrated wireless device 1600 includes only those components useful for describing some prominent features of implementations within the scope of the claims. The device 1600 includes means 1610 for transmitting a full beacon at a first multiple of a beacon interval, and means 1620 for transmitting a compressed beacon at each beacon interval that is not the first multiple of the beacon interval.

Means 1610 for transmitting a full beacon at a first multiple of a beacon interval may be configured to perform one or more of the functions discussed above with respect to the block 1510 illustrated in FIG. 15. Means 1610 for transmitting a full beacon at a first multiple of a beacon interval may correspond to one or more of the processor 204 and the transmitter 210 (FIG. 2). Means 1620 for transmitting a compressed beacon at each beacon interval that is not the first multiple of the beacon interval may be configured to perform one or more of the functions discussed above with respect to the block 1520 illustrated in FIG. 15. Means 1620 for transmitting a compressed beacon at each beacon interval that is not the first multiple of the beacon interval may correspond to one or more of the processor 204 and the transmitter 210 (FIG. 2).

Figure 17:
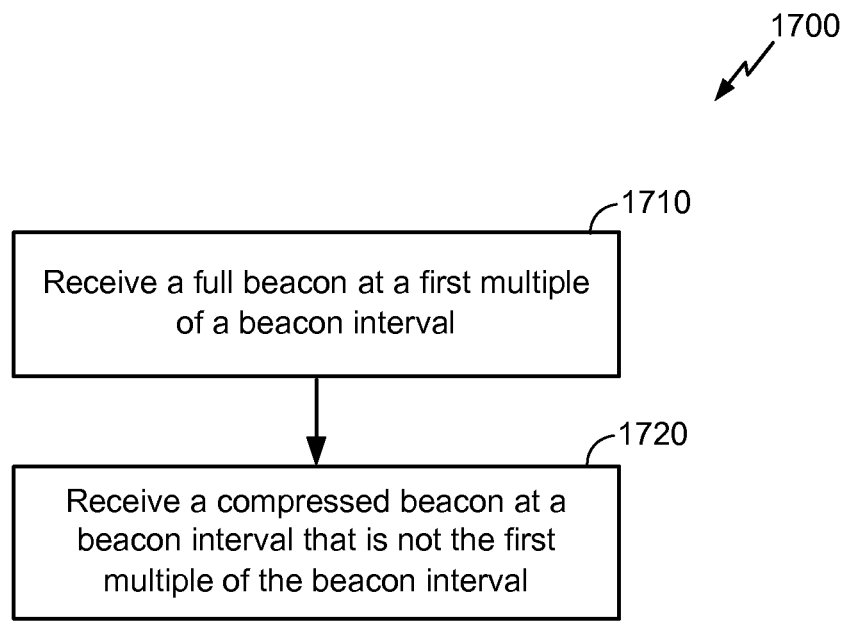
FIG. 17 shows a flowchart of another exemplary method for communicating in the wireless communication system of FIG. 1.

FIG. 17 shows a flowchart 1700 of another exemplary method for communicating in the wireless communication system 100 of FIG. 1. The method of flowchart 1700 may be used to receive a low-overhead beacon such as, for example, the low-overhead beacon 400 described above with respect to FIG. 4. The compressed beacon may be generated at the AP 104 (FIG. 1) and transmitted to a STA 106 in the wireless communication system 100. Although the method is described below with respect to elements of the wireless device 202s (FIG. 2), those having ordinary skill in the art will appreciate that the method of flowchart 1700 may be implemented by any other suitable device. In an embodiment, the steps in flowchart 1700 may be performed by the processor 204 in conjunction with the transmitter 210 and the memory 206. Although the method of flowchart 1700 is described herein with reference to a particular order, in various embodiments, blocks herein may be performed in a different order, or omitted, and additional blocks may be added.

First, at block 1710, the wireless device 202s receives a full beacon at a first multiple of a beacon interval. In an embodiment, the full beacon can be the beacon 300 described above with respect to FIG. 3. In various embodiments, the first multiple can be 2, 3, 4, 5, etc. The wireless device 202s can receive the beacon interval and/or the first multiple from the AP 104 via a field in the full beacon, in response to a probe request, or it may be preset. The wireless device 202s can receive the full beacon via the receiver 212, for example.

Next, at block 1720, at block 1710, the wireless device 202s receives a compressed beacon at a beacon interval that is not the first multiple of the beacon interval. The compressed beacon can be, for example, the beacon 400 (FIG. 4). In one embodiment, the wireless device 202s can receive the compressed beacon at a second multiple of the beacon interval, except where the second multiple coincides with the first multiple. The wireless device 202s can receive via the receiver 212, for example.

Figure 18:
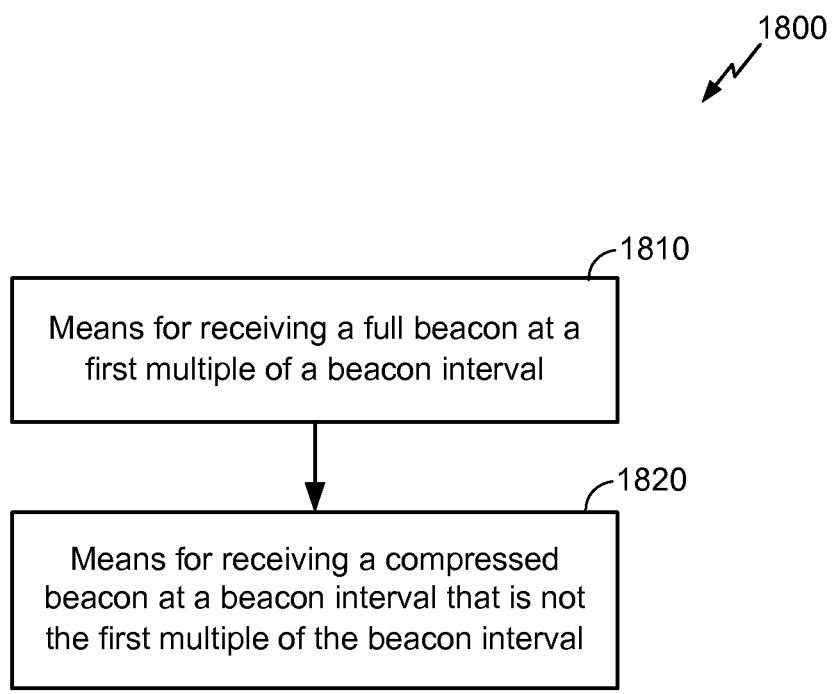
FIG. 18 is a functional block diagram of another exemplary wireless device that may be employed within the wireless communication system of FIG. 1.

FIG. 18 is a functional block diagram of another exemplary wireless device 1800 that may be employed within the wireless communication system 100 of FIG. 1. Those skilled in the art will appreciate that a wireless device 1800 may have more components than the simplified wireless device 1800 illustrated in FIG. 18. The illustrated wireless device 1800 includes only those components useful for describing some prominent features of implementations within the scope of the claims. The device 1800 includes means 1810 for receiving a full beacon at a first multiple of a beacon interval, and means 1820 for receiving a compressed beacon at a beacon interval that is not the first multiple of the beacon interval.

Means 1810 for receiving a full beacon at a first multiple of a beacon interval may be configured to perform one or more of the functions discussed above with respect to the block 1710 illustrated in FIG. 17. Means 1810 transmitting a full beacon at a first multiple of a beacon interval may correspond to one or more of the processor 204 and the receiver 212 (FIG. 2). Means 1820 for receiving a compressed beacon at a beacon interval that is not the first multiple of the beacon interval may be configured to perform one or more of the functions discussed above with respect to the block 1720 illustrated in FIG. 17. Means 1820 for receiving a compressed beacon at each beacon interval that is not the first multiple of the beacon interval may correspond to one or more of the processor 204 and the receiver 212 (FIG. 2).

Several embodiments described above include a compressed SSID field (e.g., 460). In some implementations, the compressed SSID field may be selectively generated. In some implementations, the selection may be based on the length of the full SSID for the signal. For example, if the length of the full SSID (e.g., four bytes) is equal to the length of the compressed SSID field (e.g., four bytes), the full SSID may be used as the compressed SSID. In some implementations, if the length of full SSID is longer than the length of the compressed SSID field, a CRC computed on a portion of, or all of the full SSID, may be used as the compressed SSID. The computed CRC may have a length equal to the length of the compressed SSID field. In some implementations, if the length of the full SSID is less than the length of the compressed SSID field, the full SSID may be increased in length (e.g., padded) to equal the length of the compressed SSID field to form the compressed SSID. For example, if the compressed SSID field is eight bytes and the full SSID is four bytes, four bytes of padding may be added to the full SSID to generate an eight byte compressed SSID. The padding may be included before the full SSID (e.g., at the beginning) or after the full SSID (e.g., at the end). The padding may include a null character, a padding character (e.g., alphanumeric, non-alphanumeric), or a combination thereof.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may include non-transitory computer readable medium (e.g., tangible media). In addition, in some aspects computer readable medium may include transitory computer readable medium (e.g., a signal). Combinations of the above should also be included within the scope of computer-readable media.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may include a computer program product for performing the operations presented herein. For example, such a computer program product may include a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method of communicating in a wireless network, comprising:
transmitting, at an access point, a full beacon at a full beacon interval, wherein the full beacon interval is a first multiple of a beacon interval and is longer than the beacon interval, and wherein the full beacon includes a set of fields; and
periodically transmitting a compressed beacon at each beacon interval that is not the first multiple of the beacon interval, the compressed beacon including a subset of the set of fields, wherein the full beacon interval and the beacon interval are constant intervals, and wherein a full beacon or a compressed beacon is transmitted at each beacon interval.

2. The method of claim 1, further comprising communicating the first multiple of the beacon interval in a full beacon frame or in a probe response frame.

3. The method of claim 1, further comprising including a Traffic Indication Map (TIM) in a full beacon or a compressed beacon at a second multiple of the beacon interval, the second multiple comprising a TIM period.

4. The method of claim 1, further comprising including a Delivery Traffic Indication Map (DTIM) in a full beacon or a compressed beacon at a third multiple of the beacon interval, the third multiple comprising a DTIM period.

5. The method of claim 1, wherein the compressed beacon is shorter than the full beacon.

6. The method of claim 1, wherein the compressed beacon comprises:
a frame control field;
a source address;
a timestamp;
a change sequence;
next full beacon time indication;
a shortened network identifier;
an access network options field; and
a frame check.

7. The method of claim 6, wherein the frame control field comprises 2 bytes, the source address comprises 6 bytes, the timestamp comprises 4 bytes, the change sequence comprises 1 byte, the next full beacon time indication comprises 3 bytes, the shortened network identifier comprises four bytes, the access network options field comprises one byte, and the frame check comprises 4 bytes.

8. The method of claim 6, wherein the source address comprises a basic service set identification (BSSID) of the access point.

9. The method of claim 6, wherein the timestamp comprises a shortened timestamp comprising fewer bits than a full timestamp.

10. The method of claim 9, wherein the timestamp comprises a one or more least significant bits of the full timestamp.

11. The method of claim 6, the method further comprising changing the change sequence when the access point or network configuration changes or when there is a substantial change in the content of a full beacon.

12. The method of claim 6, wherein the frame control field comprises a version field, a type field, a subtype field, a next full beacon time indication (NFBTI) present field, a service set identifier (SSID) present field, an internetworking present field, a bandwidth field, a security field, and one or more reserved bits.

13. The method of claim 12, wherein the version field comprises 2 bits, the type field comprises 2 bits, the subtype field comprises 4 bits, the NFBTI present field comprises 1 bit, the SSID present field comprises 1 bit, the internetworking present field comprises 1 bit, the bandwidth field comprises 3 bits, the security field comprises 1 bit, and the one or more reserved bits comprise 1 bit.

14. The method of claim 12, wherein the type field comprises a value of "11" and the subtype field comprises a value of "0001," indicating a compressed beacon.

15. A method of communicating in a wireless network, comprising:
receiving, at a wireless device, a full beacon at a full beacon interval, wherein the full beacon interval is a first multiple of a beacon interval and is longer than the beacon interval, and wherein the full beacon includes a set of fields; and
periodically receiving a compressed beacon at a beacon interval that is not the first multiple of the beacon interval, the compressed beacon including a subset of the set of fields, wherein the full beacon interval and the beacon interval are constant intervals, and wherein a full beacon or a compressed beacon is received at each beacon interval.

16. The method of claim 15, further comprising receiving the first multiple of the beacon interval in a full beacon frame or in a probe response frame.

17. The method of claim 15, further comprising receiving a Traffic Indication Map (TIM) in a full beacon or a compressed beacon at a second multiple of the beacon interval, the second multiple comprising a TIM period.

18. The method of claim 15, further comprising receiving a Delivery Traffic Indication Map (DTIM) in a full beacon or a compressed beacon at a third multiple of the beacon interval, the third multiple comprising a DTIM period.

19. The method of claim 15, wherein the compressed beacon is shorter than the full beacon.

20. The method of claim 15, wherein the compressed beacon comprises:
a frame control field;
a source address;
a timestamp;
a change sequence;
next full beacon time indication;
a shortened network identifier;
an access network options field; and
a frame check.

21. The method of claim 20, wherein the frame control field comprises 2 bytes, the source address comprises 6 bytes, the timestamp comprises 4 bytes, the change sequence comprises 1 byte, the next full beacon time indication comprises 3 bytes, the shortened network identifier comprises four bytes, the access network options field comprises one byte, and the frame check comprises 4 bytes.

22. The method of claim 20, wherein the source address comprises a basic service set identification (BSSID) of an access point.

23. The method of claim 20, wherein the timestamp comprises a shortened timestamp comprising fewer bits than a full timestamp.

24. The method of claim 23, wherein the timestamp comprises a one or more least significant bits of the full timestamp.

25. The method of claim 20, the method further comprising: detecting a change in the change sequence; transmitting a probe request when a change in the change sequence is detected; and receiving a probe response in response to the probe request.

26. The method of claim 20, wherein the frame control field comprises a version field, a type field, a subtype field, a next full beacon time indication (NFBTI) present field, a service set identifier (SSID) present field, an internetworking present field, a bandwidth field, a security field, and one or more reserved bits.

27. The method of claim 26, wherein the version field comprises 2 bits, the type field comprises 2 bits, the subtype field comprises 4 bits, the NFBTI present field comprises 1 bit, the SSID present field comprises 1 bit, the internetworking present field comprises 1 bit, the bandwidth field comprises 3 bits, the security field comprises 1 bit, and the one or more reserved bits comprise 1 bit.

28. The method of claim 26, wherein the type field comprises a value of "11" and the subtype field comprises a value of "0001," indicating a compressed beacon.

29. A wireless device configured to communicate in a wireless network, comprising:
a transmitter configured to:
transmit a full beacon at a full beacon interval, wherein the full beacon interval is a first multiple of a beacon interval and is longer than the beacon interval, and wherein the full beacon includes a set of fields; and
periodically transmit a compressed beacon at each beacon interval that is not the first multiple of the beacon interval, the compressed beacon including a subset of the set of fields, wherein the full beacon interval and the beacon interval are constant intervals, and wherein a full beacon or a compressed beacon is transmitted at each beacon interval.

30. The wireless device of claim 29, wherein the transmitter is further configured to communicate the first multiple of the beacon interval in a full beacon frame or in a probe response frame.

31. The wireless device of claim 29, further comprising a processor configured to include a Traffic Indication Map (TIM) in a full beacon or a compressed beacon at a second multiple of the beacon interval, the second multiple comprising a TIM period.

32. The wireless device of claim 29, further comprising a processor configured to include a Delivery Traffic Indication Map (DTIM) in a full beacon or a compressed beacon at a third multiple of the beacon interval, the third multiple comprising a DTIM period.

33. The wireless device of claim 29, wherein the compressed beacon is shorter than the full beacon.

34. The wireless device of claim 29, wherein the compressed beacon comprises:
a frame control field;
a source address;
a timestamp;
a change sequence;
next full beacon time indication;
a shortened network identifier;
an access network options field; and
a frame check.

35. The wireless device of claim 34, wherein the frame control field comprises 2 bytes, the source address comprises 6 bytes, the timestamp comprises 4 bytes, the change sequence comprises 1 byte, the next full beacon time indication comprises 3 bytes, the shortened network identifier comprises four bytes, the access network options field comprises one byte, and the frame check comprises 4 bytes.

36. The wireless device of claim 34, wherein the source address comprises a basic service set identification (BSSID) of an access point.

37. The wireless device of claim 34, wherein the timestamp comprises a shortened timestamp comprising fewer bits than a full timestamp.

38. The wireless device of claim 37, wherein the timestamp comprises a one or more least significant bits of the full timestamp.

39. The wireless device of claim 34, further comprising a processor configured to include the change sequence when an access point or network configuration changes or when there is a substantial change in the content of a full beacon.

40. The wireless device of claim 34, wherein the frame control field comprises a version field, a type field, a subtype field, a next full beacon time indication (NFBTI) present field, a service set identifier (SSID) present field, an internetworking present field, a bandwidth field, a security field, and one or more reserved bits.

41. The wireless device of claim 40, wherein the version field comprises 2 bits, the type field comprises 2 bits, the subtype field comprises 4 bits, the NFBTI present field comprises 1 bit, the SSID present field comprises 1 bit, the internetworking present field comprises 1 bit, the bandwidth field comprises 3 bits, the security field comprises 1 bit, and the one or more reserved bits comprise 1 bit.

42. The wireless device of claim 41, wherein the type field comprises a value of "11" and the subtype field comprises a value of "0001," indicating a compressed beacon.

43. A wireless device configured to communicate in a wireless network, comprising:
a receiver configured to:
receive a full beacon at a full beacon interval, wherein the full beacon interval is a first multiple of a beacon interval and is longer than the beacon interval, and wherein the full beacon includes a set of fields; and
periodically receive a compressed beacon at a beacon interval that is not the first multiple of the beacon interval, the compressed beacon including a subset of the set of fields, wherein the full beacon interval and the beacon interval are constant intervals, and wherein a full beacon or a compressed beacon is received at each beacon interval.

44. The wireless device of claim 43, wherein the receiver is further configured to receive the first multiple of the beacon interval in a full beacon frame or in a probe response frame.

45. The wireless device of claim 43, wherein the receiver is further configured to receive a Traffic Indication Map (TIM) in a full beacon or a compressed beacon at a second multiple of the beacon interval, the second multiple comprising a TIM period.

46. The wireless device of claim 43, wherein the receiver is further configured to receive a Delivery Traffic Indication Map (DTIM) in a full beacon or a compressed beacon at a third multiple of the beacon interval, the third multiple comprising a DTIM period.

47. The wireless device of claim 43, wherein the compressed beacon is shorter than the full beacon.

48. The wireless device of claim 43, wherein the compressed beacon comprises:
a frame control field;
a source address;
a timestamp;
a change sequence;
next full beacon time indication;
a shortened network identifier;
an access network options field; and
a frame check.

49. The wireless device of claim 48, wherein the frame control field comprises 2 bytes, the source address comprises 6 bytes, the timestamp comprises 4 bytes, the change sequence comprises 1 byte, the next full beacon time indication comprises 3 bytes, the shortened network identifier comprises four bytes, the access network options field comprises one byte, and the frame check comprises 4 bytes.

50. The wireless device of claim 48, wherein the source address comprises a basic service set identification (BSSID) of an access point.

51. The wireless device of claim 48, wherein the timestamp comprises a shortened timestamp comprising fewer bits than a full timestamp.

52. The wireless device of claim 51, wherein the timestamp comprises a one or more least significant bits of the full timestamp.

53. The wireless device of claim 48, further comprising: a processor configured to detect a change in the change sequence; and a transmitter is further configured to transmit a probe request when a change in the change sequence is detected, wherein the receiver is further configured to receive a probe response in response to the probe request.

54. The wireless device of claim 48, wherein the frame control field comprises a version field, a type field, a subtype field, a next full beacon time indication (NFBTI) present field, a service set identifier (SSID) present field, an internetworking present field, a bandwidth field, a security field, and one or more reserved bits.

55. The wireless device of claim 54, wherein the version field comprises 2 bits, the type field comprises 2 bits, the subtype field comprises 4 bits, the NFBTI present field comprises 1 bit, the SSID present field comprises 1 bit, the internetworking present field comprises 1 bit, the bandwidth field comprises 3 bits, the security field comprises 1 bit, and the one or more reserved bits comprise 1 bit.

56. The wireless device of claim 54, wherein the type field comprises a value of "11" and the subtype field comprises a value of "0001," indicating a compressed beacon.

57. An apparatus for communicating in a wireless network, comprising:
means for transmitting a full beacon at a full beacon interval, wherein the full beacon interval is a first multiple of a beacon interval and is longer than the beacon interval, and wherein the full beacon includes a set of fields; and
means for periodically transmitting a compressed beacon at each beacon interval that is not the first multiple of the beacon interval, the compressed beacon including a subset of the set of fields, wherein the full beacon interval and the beacon interval are constant intervals, and wherein a full beacon or a compressed beacon is transmitted at each beacon interval.

58. The apparatus of claim 57, further comprising means for communicating the first multiple of the beacon interval in a full beacon frame or in a probe response frame.

59. The apparatus of claim 57, further comprising means for including a Traffic Indication Map (TIM) in a full beacon or a compressed beacon at a second multiple of the beacon interval, the second multiple comprising a TIM period.

60. The apparatus of claim 57, further comprising means for including a Delivery Traffic Indication Map (DTIM) in a full beacon or a compressed beacon at a third multiple of the beacon interval, the third multiple comprising a DTIM period.

61. The apparatus of claim 57, wherein the compressed beacon is shorter than the full beacon.

62. The apparatus of claim 57, wherein the compressed beacon comprises:
a frame control field;
a source address;
a timestamp;
a change sequence;
next full beacon time indication;
a shortened network identifier;
an access network options field; and
a frame check.

63. The apparatus of claim 62, wherein the frame control field comprises 2 bytes, the source address comprises 6 bytes, the timestamp comprises 4 bytes, the change sequence comprises 1 byte, the next full beacon time indication comprises 3 bytes, the shortened network identifier comprises four bytes, the access network options field comprises one byte, and the frame check comprises 4 bytes.

64. The apparatus of claim 62, wherein the source address comprises a basic service set identification (BSSID) of an access point.

65. The apparatus of claim 62, wherein the timestamp comprises a shortened timestamp comprising fewer bits than a full timestamp.

66. The apparatus of claim 65, wherein the timestamp comprises a one or more least significant bits of the full timestamp.

67. The apparatus of claim 62, further comprising means for changing the change sequence when an access point or network configuration changes or when there is a substantial change in the content of a full beacon.

68. The apparatus of claim 62, wherein the frame control field comprises a version field, a type field, a subtype field, a next full beacon time indication (NFBTI) present field, a service set identifier (SSID) present field, an internetworking present field, a bandwidth field, a security field, and one or more reserved bits.

69. The apparatus of claim 68, wherein the version field comprises 2 bits, the type field comprises 2 bits, the subtype field comprises 4 bits, the NFBTI present field comprises 1 bit, the SSID present field comprises 1 bit, the internetworking present field comprises 1 bit, the bandwidth field comprises 3 bits, the security field comprises 1 bit, and the one or more reserved bits comprise 1 bit.

70. The apparatus of claim 68, wherein the type field comprises a value of "11" and the subtype field comprises a value of "0001," indicating a compressed beacon.

71. An apparatus for communicating in a wireless network, comprising:

means for receiving a full beacon at a full beacon interval, wherein the full beacon interval is a first multiple of a beacon interval and is longer than the beacon interval, and wherein the full beacon includes a set of fields; and
means for periodically receiving a compressed beacon at a beacon interval that is not the first multiple of the beacon interval, the compressed beacon including a subset of the set of fields, wherein the full beacon interval and the beacon interval are constant intervals, and wherein a full beacon or a compressed beacon is received at each beacon interval.

72. The apparatus of claim 71, further comprising means for receiving the first multiple of the beacon interval in a full beacon frame or in a probe response frame.

73. The apparatus of claim 71, further comprising means for receiving a Traffic Indication Map (TIM) in a full beacon or a compressed beacon at a second multiple of the beacon interval, the second multiple comprising a TIM period.

74. The apparatus of claim 71, further comprising means for receiving a Delivery Traffic Indication Map (DTIM) in a full beacon or a compressed beacon at a third multiple of the beacon interval, the third multiple comprising a DTIM period.

75. The apparatus of claim 71, wherein the compressed beacon is shorter than the full beacon.

76. The apparatus of claim 71, wherein the compressed beacon comprises:
a frame control field;
a source address;
a timestamp;
a change sequence;
next full beacon time indication;
a shortened network identifier;
an access network options field; and
a frame check.

77. The apparatus of claim 76, wherein the frame control field comprises 2 bytes, the source address comprises 6 bytes, the timestamp comprises 4 bytes, the change sequence comprises 1 byte, the next full beacon time indication comprises 3 bytes, the shortened network identifier comprises four bytes, the access network options field comprises one byte, and the frame check comprises 4 bytes.

78. The apparatus of claim 76, wherein the source address comprises a basic service set identification (BSSID) of an access point.

79. The apparatus of claim 76, wherein the timestamp comprises a shortened timestamp comprising fewer bits than a full timestamp.

80. The apparatus of claim 79, wherein the timestamp comprises a one or more least significant bits of the full timestamp.

81. The apparatus of claim 76, further comprising: means for detecting a change in the change sequence; means for transmitting a probe request when a change in the change sequence is detected; and means for receiving a probe response in response to the probe request.

82. The apparatus of claim 76, wherein the frame control field comprises a version field, a type field, a subtype field, a next full beacon time indication (NFBTI) present field, a service set identifier (SSID) present field, an internetworking present field, a bandwidth field, a security field, and one or more reserved bits.

83. The apparatus of claim 82, wherein the version field comprises 2 bits, the type field comprises 2 bits, the subtype field comprises 4 bits, the NFBTI present field comprises 1 bit, the SSID present field comprises 1 bit, the internetworking present field comprises 1 bit, the bandwidth field comprises 3 bits, the security field comprises 1 bit, and the one or more reserved bits comprise 1 bit.

84. The apparatus of claim 82, wherein the type field comprises a value of "11" and the subtype field comprises a value of "0001," indicating a compressed beacon.

85. A non-transitory computer-readable medium comprising code that, when executed, causes an apparatus to:
   transmit a full beacon at a full beacon interval, wherein the full beacon interval is a first multiple of a beacon interval and is longer than the beacon interval, and wherein the full beacon includes a set of fields; and
   periodically transmit a compressed beacon at each beacon interval that is not the first multiple of the beacon interval, the compressed beacon including a subset of the set of fields, wherein the full beacon interval and the beacon interval are constant intervals, and wherein a full beacon or a compressed beacon is transmitted at each beacon interval.

86. The medium of claim 85, further comprising code that, when executed, causes the apparatus to communicate the first multiple of the beacon interval in a full beacon frame or in a probe response frame.

87. The medium of claim 85, further comprising code that, when executed, causes the apparatus to include a Traffic Indication Map (TIM) in a full beacon or a compressed beacon at a second multiple of the beacon interval, the second multiple comprising a TIM period.

88. The medium of claim 85, further comprising code that, when executed, causes the apparatus to include a Delivery Traffic Indication Map (DTIM) in a full beacon or a compressed beacon at a third multiple of the beacon interval, the third multiple comprising a DTIM period.

89. The medium of claim 85, wherein the compressed beacon is shorter than the full beacon.

90. The medium of claim 85, wherein the compressed beacon comprises:
   a frame control field;
   a source address;
   a timestamp;
   a change sequence;
   next full beacon time indication;
   a shortened network identifier;
   an access network options field; and
   a frame check.

91. The medium of claim 90, wherein the frame control field comprises 2 bytes, the source address comprises 6 bytes, the timestamp comprises 4 bytes, the change sequence comprises 1 byte, the next full beacon time indication comprises 3 bytes, the shortened network identifier comprises four bytes, the access network options field comprises one byte, and the frame check comprises 4 bytes.

92. The medium of claim 90, wherein the source address comprises a basic service set identification (BSSID) of an access point.

93. The medium of claim 90, wherein the timestamp comprises a shortened timestamp comprising fewer bits than a full timestamp.

94. The medium of claim 93, wherein the timestamp comprises a one or more least significant bits of the full timestamp.

95. The medium of claim 90, further comprising code that, when executed, causes the apparatus to change the change sequence when an access point or network configuration changes or when there is a substantial change in the content of a full beacon.

96. The medium of claim 90, wherein the frame control field comprises a version field, a type field, a subtype field, a next full beacon time indication (NFBTI) present field, a service set identifier (SSID) present field, an internetworking present field, a bandwidth field, a security field, and one or more reserved bits.

97. The medium of claim 96, wherein the version field comprises 2 bits, the type field comprises 2 bits, the subtype field comprises 4 bits, the NFBTI present field comprises 1 bit, the SSID present field comprises 1 bit, the internetworking present field comprises 1 bit, the bandwidth field comprises 3 bits, the security field comprises 1 bit, and the one or more reserved bits comprise 1 bit.

98. The medium of claim 96, wherein the type field comprises a value of "11" and the subtype field comprises a value of "0001," indicating a compressed beacon.

99. A non-transitory computer-readable medium comprising code that, when executed, causes an apparatus to:
   receive a full beacon at a full beacon interval, wherein the full beacon interval is a first multiple of a beacon interval and is longer than the beacon interval, and wherein the full beacon includes a set of fields; and
   periodically receive a compressed beacon at a beacon interval that is not the first multiple of the beacon interval, the compressed beacon including a subset of the set of fields, wherein the full beacon interval and the beacon interval are constant intervals, and wherein a full beacon or a compressed beacon is received at each beacon interval.

100. The medium of claim 99, further comprising code that, when executed, causes the apparatus to receive the first multiple of the beacon interval in a full beacon frame or in a probe response frame.

101. The medium of claim 99, further comprising code that, when executed, causes the apparatus to receive a Traffic Indication Map (TIM) in a full beacon or a compressed beacon at a second multiple of the beacon interval, the second multiple comprising a TIM period.

102. The medium of claim 99, further comprising code that, when executed, causes the apparatus to receive a Delivery Traffic Indication Map (DTIM) in a full beacon or a compressed beacon at a third multiple of the beacon interval, the third multiple comprising a DTIM period.

103. The medium of claim 99, wherein the compressed beacon is shorter than the full beacon.

104. The medium of claim 99, wherein the compressed beacon comprises:
   a frame control field;
   a source address;
   a timestamp;
   a change sequence;
   next full beacon time indication;
   a shortened network identifier;
   an access network options field; and
   a frame check.

105. The medium of claim 104, wherein the frame control field comprises 2 bytes, the source address comprises 6 bytes, the timestamp comprises 4 bytes, the change sequence comprises 1 byte, the next full beacon time indication comprises 3 bytes, the shortened network identifier comprises four bytes, the access network options field comprises one byte, and the frame check comprises 4 bytes.

106. The medium of claim 104, wherein the source address comprises a basic service set identification (BSSID) of an access point.

107. The medium of claim 104, wherein the timestamp comprises a shortened timestamp comprising fewer bits than a full timestamp.

108. The medium of claim 107, wherein the timestamp comprises a one or more least significant bits of the full timestamp.

109. The medium of claim 104, further comprising code that, when executed, causes the apparatus to: detect a change in the change sequence; transmit a probe request when a change in the change sequence is detected; and receive a probe response in response to the probe request.

110. The medium of claim 104, wherein the frame control field comprises a version field, a type field, a subtype field, a next full beacon time indication (NFBTI) present field, a service set identifier (SSID) present field, an internetworking present field, a bandwidth field, a security field, and one or more reserved bits.

111. The medium of claim 110, wherein the version field comprises 2 bits, the type field comprises 2 bits, the subtype field comprises 4 bits, the NFBTI present field comprises 1 bit, the SSID present field comprises 1 bit, the internetworking present field comprises 1 bit, the bandwidth field comprises 3 bits, the security field comprises 1 bit, and the one or more reserved bits comprise 1 bit.

112. The medium of claim 110, wherein the type field comprises a value of "11" and the subtype field comprises a value of "0001," indicating a compressed beacon.

* * * * *